(12) United States Patent
Horio et al.

(10) Patent No.: US 9,090,770 B2
(45) Date of Patent: Jul. 28, 2015

(54) POLYACETAL RESIN COMPOSITION, METHOD FOR PRODUCING THE SAME, AND MOLDED ARTICLE

(75) Inventors: Mitsuhiro Horio, Tokyo (JP); Syuichi Kudou, Tokyo (JP); Seizaburoh Asai, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 288 days.

(21) Appl. No.: 13/640,965

(22) PCT Filed: Apr. 15, 2011

(86) PCT No.: PCT/JP2011/059427
§ 371 (c)(1),
(2), (4) Date: Oct. 12, 2012

(87) PCT Pub. No.: WO2011/129445
PCT Pub. Date: Oct. 20, 2011

(65) Prior Publication Data
US 2013/0035416 A1    Feb. 7, 2013

(30) Foreign Application Priority Data
Apr. 16, 2010  (JP) ................................ 2010-095089

(51) Int. Cl.
| | | |
|---|---|---|
| C08J 3/20 | (2006.01) | |
| C08L 59/04 | (2006.01) | |
| C08K 3/08 | (2006.01) | |
| C08K 5/134 | (2006.01) | |
| C08K 5/3435 | (2006.01) | |
| C08K 5/3475 | (2006.01) | |

(52) U.S. Cl.
CPC . *C08L 59/04* (2013.01); *C08K 3/08* (2013.01); *C08K 5/1345* (2013.01); *C08K 5/3435* (2013.01); *C08K 5/3475* (2013.01)

(58) Field of Classification Search
CPC .................................. C08K 3/10; C08L 23/00
USPC .................. 523/351; 524/441, 192, 101, 106
See application file for complete search history.

(56) References Cited

U.S. PATENT DOCUMENTS

| | | | |
|---|---|---|---|
| 3,027,352 A | 3/1962 | Walling et al. | |
| 3,442,866 A | 5/1969 | Seddon et al. | |
| 3,803,094 A | 4/1974 | Ishii et al. | |
| 3,857,759 A | 12/1974 | Fiore et al. | |
| 4,339,569 A | 7/1982 | Sugio et al. | |
| 4,431,794 A | 2/1984 | Sadlowski et al. | |
| 5,849,072 A | 12/1998 | Sommer et al. | |
| 6,454,847 B1 | 9/2002 | Iri et al. | |
| 6,673,405 B2 * | 1/2004 | Harashina | 428/35.7 |
| 8,034,855 B2 * | 10/2011 | Asai et al. | 524/99 |
| 8,765,850 B2 * | 7/2014 | Iwamoto et al. | 524/192 |
| 2004/0151940 A1 | 8/2004 | Takano et al. | |
| 2006/0063863 A1 | 3/2006 | Sunaga et al. | |
| 2010/0261817 A1 | 10/2010 | Asai et al. | |
| 2010/0280156 A1 | 11/2010 | Hase | |

FOREIGN PATENT DOCUMENTS

| | | |
|---|---|---|
| DE | 1161421 B | 1/1964 |
| DE | 1495228 B | 2/1969 |
| DE | 1720358 B | 4/1972 |
| DE | 30 18 898 B | 11/1980 |
| EP | 1 080 810 A1 | 7/2001 |
| GB | 974819 | 3/1962 |
| JP | 49-062469 | 6/1973 |
| JP | 58-098322 | 6/1983 |
| JP | 61-159453 | 7/1986 |
| JP | 61-241333 | 10/1986 |
| JP | 62-020574 | 1/1987 |
| JP | 03-123777 | 5/1991 |
| JP | 05-271217 | 10/1993 |
| JP | 07-33761 | 2/1995 |
| JP | 07-070267 | 3/1995 |
| JP | 8-510294 | 10/1996 |
| JP | 2001-261978 | 9/2001 |
| JP | 2005-271405 A | 10/2005 |
| JP | 2006-111874 | 4/2006 |
| JP | 2007-191738 | 8/2007 |
| JP | 2009-120705 | 6/2009 |

(Continued)

OTHER PUBLICATIONS

Extended European Search Report issued with respect to counterpart European Application No. 11768966.1, mail date is Jan. 3, 2014.

(Continued)

*Primary Examiner* — Hannah Pak
(74) *Attorney, Agent, or Firm* — Greenblum & Bernstein, P.L.C.

(57) ABSTRACT

A polyacetal resin composition and molded article having a high metallic gloss, small change in a color tone according to the viewing angle, high weld performance, and high mechanical properties can be provided in which the amount of formaldehyde to be produced in molding and recycle is suppressed, the mold deposit is improved, and the repeated impact resistance after aging is high. A polyacetal resin composition comprising: (A) 100 parts by mass of a polyacetal copolymer resin, and (B) 0.1 to 10 parts by mass of an aluminum pigment, the aluminum pigment having a coin-like or flake-like flat shape, a volume average particle size $D_{50}$ of 15 to 50 μm, an average surface roughness Ra of 20 to 50 nm, and an average height Rc of depressions and projections in a surface roughness curve of 80 to 200 nm.

14 Claims, 2 Drawing Sheets

(56) References Cited

FOREIGN PATENT DOCUMENTS

| | | |
|---|---|---|
| JP | 2009-155418 | 7/2009 |
| JP | 2010-065210 | 3/2010 |
| WO | 99/54074 | 10/1999 |
| WO | 02/094950 | 11/2002 |
| WO | 2004/026970 | 4/2004 |
| WO | 2009/081517 A1 | 7/2009 |

OTHER PUBLICATIONS

Search report from International Application No. PCT/JP2011/059427, mail date is Jul. 26, 2011.

International Preliminary Report on Patentability for International Application No. PCT/JP2011/059427, mail date is Nov. 6, 2012.

* cited by examiner

ARITHMETIC AVERAGE ROUGHNESS OF SURFACE ROUGHNESS CURVE

HEIGHT OF DEPRESSIONS AND PROJECTIONS IN SURFACE ROUGHNESS CURVE

POLYACETAL RESIN COMPOSITION, METHOD FOR PRODUCING THE SAME, AND MOLDED ARTICLE

TECHNICAL FIELD

The present invention relates to a polyacetal resin composition, a method for producing the same, and a molded article.

BACKGROUND ART

Polyacetal resins have high mechanical strength and rigidity, have high oil resistance, organic solvent resistance, and self lubrication, and have a good balance among properties in a wide temperature range.

The polyacetal resins are easy to process, and used as typical engineering plastics in a wide range including mechanical parts and sliding parts for precision instruments, home appliances, OA apparatuses, automobiles, and industrial materials and articles.

Particularly, it is known that the polyacetal copolymer has a comonomer component more chemically stable than the polyacetal homopolymer; accordingly, decomposition does not continuously progress even if the chain is cut in the middle thereof, providing high heat aging resistance, hydrolysis resistance, and molding stability.

Recently, the polyacetal resin has been used in a broader application field, leading to higher performance to be demanded.

In such circumstances above, in order to enhance designability of molded articles in addition to the various physical properties, attempts have been made to improve appearance properties and give a metallic gloss to the molded articles.

For example, a method for producing a molded article has been proposed in which the surface of a difficult-to-adhere resin is subjected to a blasting treatment, and a metallic film is formed on the surface of the resin by vacuum evaporation (for example, see Patent Document 1.).

Moreover, as a coating material to be applied to a molded article formed of a polyacetal resin in order to improve the appearance, a metallic pigment dispersion comprising a flake-like metallic pigment having an extremely small content of a product by a fatty acid reaction or decomposition and a binder or a binder solution has been proposed (for example, see Patent Document 2.).

Further, a powder coating material composition comprising a thermosetting resin powder having a flake-like pigment bonded to the surface thereof has been proposed (for example, see Patent Document 3.).

Moreover, attempts have been made to demonstrate a metallic gloss by molding a resin containing a gloss pigment and give designability. For example, a metallic pigment having a specific particle size and shape ratio (thickness/particle size ratio) and added to a synthetic resin composition and a resin molded product containing the metallic pigment have been proposed (for example, see Patent Documents 4 and 5.).

Further, methods have been proposed such as a method in which a predetermined amount of a metallic pigment and a predetermined amount of a colorant which can optically change are contained in a thermoplastic resin; a method in which a gloss pigment to be added to a resin and comprising a specific aluminum particle is contained (for example, see Patent Documents 6 and 7.); and a method in which a weather proofing agent, a formaldehyde inhibitor, and a metallic pigment are added to a polyacetal resin having a specific terminal structure (for example, see Patent Document 8.), and suppression in the amount of formaldehyde to be produced and improvement in the weatherability are shown as the effects.

Moreover, a composition has been proposed in which a polyacetal copolymer contains a weather proofing agent, an aluminum particle having a specific particle size, particle size distribution, and particle thickness, and a specific fatty acid, and production stability, mechanical physical properties, molding appearance, weld performance, and lightness are high (for example, see Patent Document 9.).

Further, as improvement of an aluminum pigment, in addition to improvement in the particle size and shape ratio (thickness/particle size ratio), a technique has been proposed in which the surface roughness of the aluminum particle is focused, and high luminance and high flop properties are given (for example, see Patent Document 10.).

PRIOR ART DOCUMENTS

Patent Document

Patent Document 1: Japanese Patent Laid-Open No. 2007-191738
Patent Document 2: National Publication of International Patent Application No. 8-510294
Patent Document 3: WO 2002/094950
Patent Document 4: Japanese Patent Laid-Open No. 61-241333
Patent Document 5: Japanese Patent Laid-Open No. 61-159453
Patent Document 6: Japanese Patent Laid-Open No. 2001-261978
Patent Document 7: WO 2004/026970
Patent Document 8: Japanese Patent Laid-Open No. 2009-155418
Patent Document 9: Japanese Patent Laid-Open No. 2010-065210
Patent Document 10: WO 1999/054074

SUMMARY OF INVENTION

Problems to be Solved by the Invention

Unfortunately, according to the methods such as plating and coating proposed in Patent Documents 1 to 3 above, while the appearance properties of the molded article are improved, an extremely large number of steps are necessary to be managed. The methods have a problem of poor practical productivity.

Moreover, in the coating method proposed by these, a coating film or the like may not be fixed to the surface of the molded article, and a molded article having a good appearance cannot be always stably produced. Further, considering influences of the solvent used in the coating on an environment and human bodies, it cannot be always said that this is a good method.

Moreover, according to the techniques described in Patent Documents 4 to 7 above, due to heat generated during melting and mixing and influences by the active site of the metal surface, problems such as reduction in thermal stability and mechanical properties of the molded article, and increase in the amount of formaldehyde to be produced may arise, for example.

Further, Patent Document 8 proposes the technique for providing the thermal stability of the molded article and suppressing formaldehyde, but only shows a metallic pigment in which an aluminum powder is dispersed in polyethylene. No examination is found about an influence of the shape, particle size, surface state and the like of the particle of the aluminum powder on the metallic gloss, an influence of the aluminum powder to the amount of formaldehyde to be produced, and the like. In addition, no sufficient effects about these are obtained.

Further, Patent Document 9 proposes the composition having high mechanical physical properties, molding appearance, weld performance, and lightness provided using a weather proofing agent and an aluminum particle having a specific particle size, particle size distribution, and particle thickness for a polyacetal copolymer. This proposal aims at a high metallic gloss, but has a problem such that the gloss level greatly changes depending on the viewing angle.

Further, Patent Document 10 improves the surface roughness of the aluminum pigment to provide high luminance and high flop properties (a degree of change in the coating appearance greatly changes depending on the viewing angle), and naturally has a problem of great gloss level change depending on the angle as the resin composition.

Under such circumstances above, there has been a demand for a material having a high metallic gloss, small gloss level change depending on the viewing angle, and high appearance properties while mechanical properties of the polyacetal resin are kept.

Further, from the viewpoint of environmental consideration and long-term stability, a material has been demanded in which production of formaldehyde is suppressed, a mold deposit in a molding process is improved, and impact resistance after heating aging is high.

Then, in consideration of the problems in the related art, an object of the present invention is to provide a polyacetal resin composition and a molded product having a high metallic gloss, small gloss level change depending on the viewing angle, and high weld performance, and keeping mechanical properties that a polyacetal resin intrinsically has. Further, another object of the present invention is to provide a polyacetal resin composition and a molded product in which by using a formaldehyde inhibitor and selecting a specific formaldehyde inhibitor, suppression in the amount of formaldehyde to be produced in molding and the amount of formaldehyde to be produced in recycling are achieved in addition to the properties, a mold deposit in a molding process is improved, and repeated impact resistance after aging is high.

Means for Solving the Problems

As a result of extensive research in order to improve the appearance of a molded article formed with a polyacetal resin composition and give designability, the present inventors found out that if the polyacetal copolymer resin contains an aluminum pigment having a specific shape, a specific particle size, and a specific surface state, a polyacetal resin composition and a molded article are provided having a high metallic gloss, small gloss level change depending on the viewing angle, and high weld performance, and keeping mechanical properties that the polyacetal resin intrinsically has, which are problems in the related art. Thus, the present invention has been completed.

Further, the present inventors found out that a polyacetal resin composition and a molded product are provided in which by using a formaldehyde inhibitor, in addition to the properties above, the amount of formaldehyde to be produced in molding is suppressed; further, by selecting a specific formaldehyde inhibitor, the amount of formaldehyde to be produced in molding and the amount of formaldehyde to be produced in recycling can be further suppressed, a mold deposit in a molding process is improved, and repeated impact resistance after aging is high.

Namely, the present invention is as follows.

[1]
A polyacetal resin composition comprising:
(A) 100 parts by mass of a polyacetal copolymer resin, and
(B) 0.1 to 10 parts by mass of an aluminum pigment, the aluminum pigment having a coin-like or flake-like flat shape, a volume average particle size $D_{50}$ of 15 to 50 μm, an average surface roughness Ra of 20 to 50 nm, and an average height Rc of depressions and projections in a surface roughness curve of 80 to 200 nm.

[2]
The polyacetal resin composition according to [1] above, wherein the (B) aluminum pigment contains 5 to 40% by volume of a particle having a particle size of not more than 10 μm.

[3]
The polyacetal resin composition according to [1] or [2] above, wherein the (A) polyacetal copolymer resin further comprises at least one of an antioxidant and a hindered amine stabilizer.

[4]
The polyacetal resin composition according to any one of [1] to [3] above, further comprising 0.005 to 5 parts by mass of (C) a formaldehyde inhibitor.

[5]
The polyacetal resin composition according to [4] above, wherein the (C) formaldehyde inhibitor is at least one selected from aminotriazine compounds, cyclic urea compounds, and carboxylic acid hydrazide compounds.

[6]
The polyacetal resin composition according to [4] or [5] above, wherein the (C) formaldehyde inhibitor is a combined inhibitor of a carboxylic acid hydrazide compound comprising a mixture of a carboxylic acid hydrazide (C-1) and a carboxylic acid hydrazide (C-2) different from the (C-1); the (C) formaldehyde inhibitor is contained in an amount of 0.01 to 2 parts by mass; and the melting point of the mixture of the carboxylic acid hydrazide (C-1) and the carboxylic acid hydrazide (C-2) as measured using a differential thermal analyzer satisfies the following expressions (1) and (2):

$$T1<T2 \tag{1}$$

$$T1<T3 \tag{2}$$

wherein T1 represents a temperature (° C.) at which an amount of heat to be absorbed shows a vertex of the largest endothermic peak among endothermic peaks obtained by heating and cooling the mixture of the carboxylic acid hydrazide (C-1) and the carboxylic acid hydrazide (C-2) according to a predetermined temperature program below, and raising a temperature at a rate of 2.5° C./min until the mixture melts;

T2 represents a temperature (° C.) at which an amount of heat to be absorbed shows a vertex of the largest endothermic peak among endothermic peaks obtained by heating and cooling the carboxylic acid hydrazide (C-1) according to a predetermined temperature program, and raising a temperature at a rate of 2.5° C./min until the carboxylic acid hydrazide (C-1) melts;

T3 represents a temperature (° C.) at which an amount of heat to be absorbed shows a vertex of the largest endothermic peak among endothermic peaks obtained by heating and cooling the polyacetal copolymer resin (A) according to a predetermined temperature program, and raising a temperature at a rate of 2.5° C./min until the polyacetal copolymer resin (A) melts;

the predetermined temperature program used for determination of T1 and T2 means a program comprising raising a temperature at a rate of 2.5° C./min from a temperature lower than the endothermic peak temperature of a compound to be measured to a temperature at which the compound to be measured melts, keeping the temperature for 2 minutes, and then, lowering the temperature to 100° C. at a temperature falling rate of 10° C./min by allowing it to stand; and the predetermined temperature program for polyacetal copolymer resin (A) used for determination of T3 means a temperature program comprising raising a temperature at a rate of 320° C./rain from a temperature lower than the endothermic peak temperature of the polyacetal copolymer resin (A) to 200° C., keeping the temperature at 200° C. for 2 minutes, and lowering the temperature at a rate of 10° C./min to 100° C.

[7]

The polyacetal resin composition according to [6] above, wherein the carboxylic acid hydrazide (C-1) and the carboxylic acid hydrazide (C-2) are different carboxylic acid dihydrazides selected from the group consisting of adipic acid hydrazide, sebacic acid hydrazide, and dodecanedioic acid hydrazide.

[8]

A method for producing a polyacetal resin composition, comprising the steps of: blending (A) a polyacetal copolymer resin with (C) a formaldehyde inhibitor, and mixing the blend with (B) an aluminum pigment and, when necessary, a complementary color pigment, and extrusion kneading the mixture.

[9]

A molded article obtained by molding the polyacetal resin composition according to any one of [1] to [7] above.

[10]

The molded article according to [9] above, wherein in a gloss level of the molded article measured according to JIS Z8741, a measured value at a measured angle of 45° is not less than 50% when a measured value at a measured angle of 60° is 100%.

[11]

The molded article according to [9] or [10] above, wherein the molded article is one of parts selected from the group consisting of parts included in OA apparatuses, music, video, or information apparatuses, or communication apparatuses, industrial parts included in office furniture or housing apparatuses, and parts for interiors and exteriors of automobiles.

[12]

The molded article according to any one of [9] to [11] above, wherein the molded article has a designed surface having grain finish.

[13]

The molded article according to any one of [9] to [12] above, wherein the molded article is a part selected from the group consisting of parts for handles, switches, and buttons.

Advantageous Effects of Invention

The present invention can provide a polyacetal resin composition and molded article having a high metallic gloss, small change in a color tone depending the viewing angle, and high weld performance, and keeping mechanical properties that the polyacetal resin intrinsically has.

In addition to the properties above, the present invention can provide a polyacetal resin composition and a molded article in which by using the formaldehyde inhibitor and selecting the specific formaldehyde inhibitor, the amount of formaldehyde to be produced in molding and the amount of formaldehyde to be produced in recycling can be suppressed, a mold deposit in molding is improved, and repeated impact resistance after aging is high.

MODE FOR CARRYING OUT THE INVENTION

Figure 1:
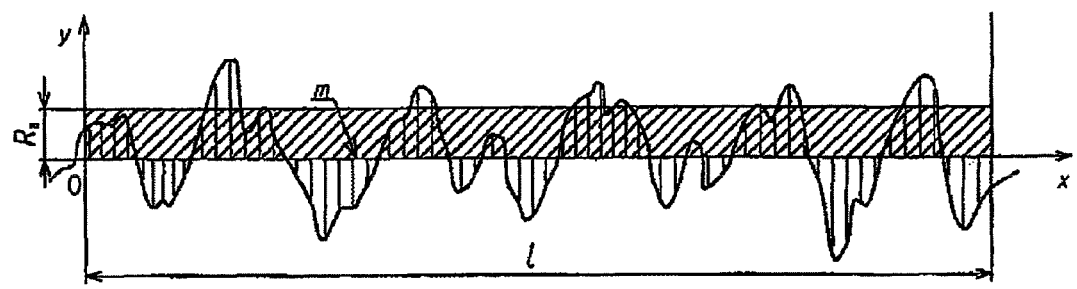
FIG. 1 shows a surface roughness curve for calculating an average surface roughness Ra.

Hereinafter, an embodiment for implementing the present invention (hereinafter, referred to as "the present embodiment.") will be described.

The present invention will not be limited to the description below, but can be modified within the scope of the gist and implemented.

[Polyacetal Resin Composition]

The polyacetal resin composition according to the present embodiment comprises:

(A) 100 parts by mass of a polyacetal copolymer resin, and (B) 0.1 to 10 parts by mass of an aluminum pigment, the aluminum pigment having a coin or flake-like flat shape, an average particle size $d_{50}$ of 15 to 50 µm, an average surface roughness Ra of 20 to 50 nm, an average height Rc of depressions and projections in a surface roughness curve of 80 to 200 nm.

((A) Polyacetal Copolymer Resin)

The (A) polyacetal copolymer resin that forms the polyacetal resin composition according to the present embodiment is a copolymer having an oxymethylene group in the main chain, and an oxyalkylene unit having 2 or more carbon atoms in the molecule.

<Method for Producing (A) Polyacetal Copolymer Resin>

In polymerization of the (A) polyacetal copolymer resin, except for the description in the specification, a known polymerization method can be used (for example, polymerization methods described in U.S. Pat. No. 3,027,352, U.S. Pat. No. 3,803,094, German Patent No. 1161421, German Patent No. 1495228, German Patent No. 1720358, German Patent No. 3018898, Japanese Patent Laid-Open No. 58-98322, and Japanese Patent Laid-Open No. 7-70267).

Namely, first, a crude polymer of a polyacetal copolymer is obtained in (1) a polymerization step below. Next, unstable terminal portions contained in the crude polymer are decomposed and removed by (2) a terminal stabilization treatment below to stabilize the terminal. Thereby, the (A) polyacetal copolymer resin is obtained.

[(1) Polymerization Step]

A main monomer is copolymerized with a comonomer in the presence of a polymerization catalyst, when necessary, using a chain transfer agent to obtain the crude polymer of the polyacetal copolymer.

The main monomer preferably used is a cyclic oligomer such as formaldehyde, trioxane as a trimer thereof, or tetraoxiane as a tetramer.

Examples of the comonomer may include cyclic ether compounds having an oxyalkylene unit having 2 or more carbon atoms in the molecule. Specifically, preferably used are one or two or more monomers selected from the group consisting of ethylene oxide, propylene oxide, 1,3-dioxolane, 1,3-propanediol formal, 1,4-butanediol formal, 1,5-pentanediol formal, 1,6-hexanediol formal, diethylene glycol formal, 1,3,5-trioxepane, 1,3,6-trioxocane, and monomers enabling formation of a branch or crosslinking structure in the molecule, and diglycidyl compound.

The amount of the comonomer to be copolymerized is preferably 1.0 to 10.0 mol % based on 100 mol % of trioxane when the main monomer is in terms of trioxane (formaldehyde trimer).

The amount of the comonomer to be copolymerized is more preferably 1.0 to 6.0 mol %, and still more preferably 1.2 to 4.5 mol %.

If the amount of the comonomer to be copolymerized is controlled within the preferred range, the molded article using the polyacetal resin composition according to the present embodiment shows a better balance among the mechanical physical properties, thermal stability in residence molding, and the amount of formaldehyde to be produced.

As the main monomer and comonomer for the polyacetal copolymer resin, preferably used are those not containing impurities having polymerization terminating and chain transfer actions during the polymerization reaction such as water, methanol, and formic acid as much as possible.

If these impurities excessively exist, a polyacetal copolymer resin having a desired molecular weight is likely to be difficult to obtain due to an unexpected chain transfer reaction.

Particularly, the content of the impurities that introduce a hydroxyl group into a polymer terminal group is preferably not more than 30 mass ppm, more preferably not more than 10 mass ppm, and still more preferably not more than 3 mass ppm based on the total amount of the monomer.

As methods for providing a main monomer and comonomer having a small content of impurities, known methods can be used (for example, the methods described in Japanese Patent Laid-Open No. 3-123777 and Japanese Patent Laid-Open No. 7-33761 for the main monomer, and the methods described in Japanese Patent Laid-Open No. 49-62469 and Japanese Patent Laid-Open No. 5-271217 for the comonomer).

A known chain transfer agent can be used as the chain transfer agent used in the (1) polymerization step. For example, preferably used are dialkyl acetals of formaldehyde having a lower aliphatic alkyl group having 1 to 4 carbon atoms such as a methyl group, an ethyl group, a propyl group, an isopropyl group, and a butyl group and oligomers thereof; and lower aliphatic alcohol having 1 to 4 carbon atoms such as methanol, ethanol, propanol, isopropanol, and butanol.

In order to obtain long-chain branched polyacetal, polyether polyol and a polyether polyol-alkylene oxide unit may be used as the chain transfer agent.

One of the chain transfer agents may be used alone, or two or more thereof may be used in combination.

In order to obtain a block polyacetal copolymer, a polymer having one of one or more hydroxyl groups, carboxyl groups, amino groups, ester groups, and alkoxy groups and a number average molecular weight of not less than 400 may be chain transferred by a standard method.

Preferred is a chain transfer agent that forms as a small amount of unstable terminals as possible.

As a polymerization catalyst used in the polymerization step of the polyacetal copolymer resin, preferred are cation-active catalysts such as Lewis acids, proton acids, esters thereof, or anhydrides thereof.

Examples of Lewis acids may include boric acid, halides of tin, titanium, phosphorus, arsenic, and antimony. More specifically, examples thereof may include boron trifluoride, tin tetrachloride, titanium tetrachloride, phosphorus pentachloride, phosphorus pentachloride, antimony pentachloride, and complexes or salts thereof.

Specific examples of proton acids and esters or anhydrides thereof may include perchloric acid, trifluoromethanesulfonic acid, perchloric acid-tertiary butyl ester, acetyl perchlorate, and trimethyloxonium hexafluorophosphate. Among these, preferred are boron trifluoride, boron trifluoridehydrate, and coordinated complexes of an organic compound containing an oxygen atom or a sulfur atom and boron trifluoride, and more preferred are boron trifluoride diethyl ether and boron trifluoride di-n-butyl ether.

The amount of these polymerization catalysts to be used is preferably $1 \times 10^{-6}$ mol to $1 \times 10^{-3}$ mol, and more preferably $5 \times 10^{-6}$ mol to $1 \times 10^{-4}$ mol based on 1 mol of the main monomer (for example, the total amount of trioxane and cyclic ether and/or cyclic formal).

If the amount of these polymerization catalysts to be used is controlled within the range above, reaction stability during polymerization and thermal stability of the molded article to be obtained are further improved.

In the polymerization step of the polyacetal copolymer resin, a cocatalyst may be used when necessary.

[(2) Terminal Stabilization Treatment]

This is a step of decomposing and removing the unstable terminal portions contained in the crude polymer obtained by the terminal stabilization treatment and the (1) Polymerization Step, Thereby to Stabilize the Terminal.

Examples of a method for decomposing and removing unstable terminal portions may include a method in which using a single screw extruder with a vent or a twin screw extruder with a vent, in the presence of a decomposing and removing agent as a known basic substance, the crude polymer is molten, and the unstable terminal portions are decomposed and removed.

When melt kneading is performed in the stabilization of the terminal, preferably, an atmosphere within the system is replaced by an inert gas or degassed using single stage and mutli-stage vents in order to keep the quality of a product and a working environment. The melt kneading temperature is preferably not less than the melting point of the polyacetal copolymer resin and not more than 260° C.

Further, in the terminal stabilization treatment step, preferably, while a known stabilizer that can be usually added to the polyacetal resin is added to the crude polymer, the stabilizer and the crude polymer are molten and mixed, and the mixture is granulated to obtain a pellet.

Examples of the decomposing and removing agent may include aliphatic amines such as ammonia, triethylamine, and tributylamine, hydroxides of alkali metals or alkaline earth metals such as calcium hydroxide, known basic substances such as inorganic weak acid salts and organic weak acid salts.

Preferred examples of the decomposing and removing agent may include at least one of quaternary ammonium compounds represented by the formula (I).

Unstable terminal groups hardly remain in the polyacetal copolymer resin if thermally unstable terminals of the polyacetal copolymer resin are treated and stabilized using the decomposing and removing agent.

$$[R^1R^2R^3R^4N^+]_n X^{n-} \quad \text{(I)}$$

In the formula (I), $R^1$, $R^2$, $R^3$, and $R^4$ each independently represents one of a non-substituted alkyl group or substituted alkyl group having 1 to 30 carbon atoms; an aryl group having 6 to 20 carbon atoms; an aralkyl group having non-substituted alkyl group or substituted alkyl group having 1 to 30 carbon atoms substituted with at least one aryl group having 6 to 20 carbon atoms; and an alkylaryl group having an aryl group having 6 to 20 carbon atoms substituted with at least one non-substituted alkyl group or substituted alkyl group having 1 to 30 carbon atoms. The non-substituted alkyl group or substituted alkyl group may be linear, branched, or cyclic. A hydrogen atom in the non-substituted alkyl group, the aryl group, the aralkyl group, and the alkylaryl group may be replaced by a halogen atom or a hydroxyl group.

In the formula (I), n is an integer of 1 to 3. X represents a hydroxyl group or a residue of one of carboxylic acids having 1 to 20 carbon atoms, hydroacids, oxoacids, inorganic thioic acids, or organic thioic acids having 1 to 20 carbon atoms.

Examples of the quaternary ammonium compound usable as the decomposing and removing agent may include hydroxides of tetramethylammonium, tetraethylammonium, tetrapropylammonium, tetra-n-butylammonium, cetyltrimethylammonium, tetradecyltrimethylammonium, 1,6-hexamethylenebis(trimethylammonium), decamethylenebis(trimethylammonium), trimethyl-3-chloro-2-hydroxypropylammonium, trimethyl(2-hydroxyethyl)ammonium, triethyl(2-hydroxyethyl)ammonium, tripropyl(2-hydroxyethyl)ammonium, tri-n-butyl(2-hydroxyethyl)ammonium, trimethylbenzylammonium, triethylbenzylammonium, tripropylbenzylammonium, tri-n-butylbenzylammonium, trimethylphenylammonium, triethylphenylammonium, trimethyl-2-oxyethylammonium, monomethyltrihydroxyethylammonium, monoethyltrihydroxyethylammonium, octadecyltri(2-hydroxyethyl)ammonium, and tetrakis(hydroxyethyl)ammonium.

Instead of the hydroxides, hydroacid salts such as hydrogen azide except for halogenation; oxoacid salts such as sulfuric acid, nitric acid, phosphoric acid, carbonic acid, boric acid, chloric acid, iodic acid, silicic acid, perchloric acid, chlorous acid, hypochlorous acid, chlorosulfuric acid, amidesulfuric acid, disulfuric acid, and tripolyphosphoric acid; thioic acid salts such as thiosulfuric acid; and carboxylic acid salts such as formic acid, acetic acid, propionic acid, butanoic acid, isobutyric acid, pentanoic acid, caproic acid, caprylic acid, capric acid, benzoic acid, and oxalic acid may be used.

Among these, more preferable quaternary ammonium compounds are salts of hydroxides ($OH^-$), sulfuric acid ($HSO_4^-$, $SO_4^{2-}$), carbonic acid ($HCO_3^-$, $CO_3^{2-}$), boric acid ($B(OH)_4^-$), and carboxylic acids. Among the carboxylic acids, particularly preferred are formic acid, acetic acid, and propionic acid.

One of the quaternary ammonium compounds may be used alone, or two or more thereof may be used in combination.

The amount of the quaternary ammonium compound to be added is preferably 0.05 to 50 mass ppm in terms of the amount of nitrogen derived from the quaternary ammonium compound based on the crude polymer.

The quaternary ammonium compound may be added in advance before the crude polymer is molten, or may be added to a molten crude polymer.

In the step of the (2) terminal stabilization treatment, the quaternary ammonium compound may be used in combination with a known decomposing and removing agent such as ammonia, triethylamine, and a boric acid compound.

In the (A) polyacetal copolymer resin obtained by the (1) polymerization step and the (2) terminal stabilization treatment, the MFR (melt flow rate; according to ASTM D57E, temperature condition: 190° C.) is preferably 2.5 to 40 g/10 min, and more preferably 3 to 30 g/10 min.

If the MFR is controlled within the range, the mechanical physical properties, the thermal stability in residence molding, and the amount of formaldehyde to be produced are provided in a good balance.

<Stabilizer Contained in (A) Polyacetal Copolymer Resin>

Preferably, the (A) polyacetal copolymer resin contains a stabilizer conventionally used for the polyacetal resin.

Examples of the stabilizer may include an antioxidant, a formaldehyde or formic acid trapping agent, hindered amine stabilizers as a weathering stabilizer, and an ultraviolet absorbing agent. These may be used alone. Preferably, two or more thereof are used in combination because a higher effect is demonstrated.

The antioxidant is preferably a hindered phenol antioxidant. Examples thereof may include n-octadecyl-3-(3'5'-di-t-butyl-4'-hydroxyphenyl)-propionate, n-octadecyl-3-(3'-methyl-5'-t-butyl-4'-hydroxyphenyl)-propionate, n-tetradecyl-3-(3'5'-di-t-butyl-4'-hydroxyphenyl)-propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), triethylene glycol-bis-(3-(3-t-butyl-5-methyl-4-hydroxyphenyl)-propionate).

Further examples of the hindered phenol antioxidant may include tetrakis-(methylene-3-(3',5'-di-t-butyl-4'-hydroxyphenyl)propionate)methane, 3,9-bis(2-(3-(3-t-butyl-4-hydroxy-5-methylphenyl)propionyloxy)-1,1-dimethylethyl)-2,4,8,10-tetraoxaspiro(5,5)undecane, N,N'-bis-3-(3'5'-di-t-butyl-4-hydroxyphenol)propionylhexamethylenediamine, N,N'-tetramethylenebis-3-(3'-methyl-5'-t-butyl-4-hydroxyphenol)propionyldiamine, N,N'-bis-(3-(3,5-di-t-butyl-4-hydroxyphenol)propionyl)hydrazine, N-salicyloyl-N'-salicylidenehydrazine, 3-(N-salicyloyl)amino-1,2,4-triazole, and N,N'-bis(2-(3-(3,5-di-butyl-4-hydroxyphenyl)propionyloxy)ethyl)oxyamide.

Among the hindered phenol antioxidants, preferred are triethylene glycol-bis-(3-(3-t-butyl-5-methyl-4-hydroxyphenyl)-propionate), and tetrakis-(methylene-3-(3',5'-di-t-butyl-4'-hydroxyphenyl)propionate)methane.

The amount of the hindered phenol antioxidant to be added is in the range of preferably 0.01 to 2 parts by mass, and more preferably 0.02 to 1 part by mass based on 100 parts by mass of the (A) polyacetal copolymer resin. At an amount in the range of 0.01 to 2 parts by mass, the polyacetal resin composition according to the present embodiment has improved and good thermal stability during the molding process.

Examples of the formaldehyde or formic acid trapping agent may include compounds and polymers containing formaldehyde-reactive nitrogen, fatty acid calcium salts, hydroxides, inorganic acid salts, carboxylic acid salts, or alkoxides of alkali metals or alkaline earth metals.

Examples of the compounds containing formaldehyde-reactive nitrogen may include dicyandiamide, amino-substituted triazine, and a co-condensate of amino-substituted triazine and formaldehyde.

Examples of the amino-substituted triazine may include guanamine(2,4-diamino-sym-triazine), melamine(2,4,6-triamino-sym-triazine), N-butylmelamine, N-phenylmelamine, N,N-diphenylmelamine, N,N-diallylmelamine, N,N',N''-triphenylmelamine, N-methylolmelamine, N,N'-dimethylolmelamine, N,N',N''-trimethylolmelamine, and benzoguanamine(2,4-diamino-6-phenyl-sym-triazine). Examples thereof may include 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine (ammelide), 2-oxy-4,6- diamino-sym-triazine (ameline), and N,N',N'-tetracyanoethylbenzoguanamine.

Examples of the co-condensate of the amino-substituted triazine and formaldehyde may include melamine-formaldehyde polycondensates.

Among the various additives, preferred are dicyandiamide, melamine and melamine-formaldehyde polycondensates Examples of the polymers having formaldehyde-reactive nitrogen as the formaldehyde or formic acid trapping agent may include polymers obtained by polymerizing a polyamide resin, acrylamide, and a derivative thereof, or acrylamide and a derivative thereof with other vinyl monomer in the presence of metal alcholate; polymers obtained by polymerizing acrylamide and a derivative thereof or acrylamide and a derivative thereof with other vinyl monomer in the presence of radical polymerization; and polymers having a nitrogen atom such as amines, amides, ureas, and urethanes.

Examples of the polyamide resin may include nylon 4-6, nylon 6, nylon 6-6, nylon 6-10, nylon 6-12, nylon 12, and copolymerized products thereof such as nylon 6/6-6, nylon 6/6-6/6-10, and nylon 6/6-12.

Examples of the polymers obtained by polymerizing a polyamide resin, acrylamide, and a derivative thereof, or acrylamide and a derivative thereof with other vinyl monomer in the presence of a metal alcholate may include poly-$\beta$-alanine copolymers.

These polymers and copolymers can be produced by the methods described in Japanese Patent Publication No. 6-12259 (U.S. Pat. No. 5,015,707), Japanese Patent Publication No. 5-87096, Japanese Patent Publication No. 5-47568, and Japanese Patent Laid-Open No. 3-234729.

Examples of the fatty acid calcium salts as the formaldehyde or formic acid trapping agent may include calcium salts of a saturated or unsaturated fatty acid having 10 to 36 carbon atoms, and the calcium salts may have an optionally substituted hydroxyl group.

Examples of the saturated fatty acid may include capric acid, lauric acid, myristic acid, palmitic acid, stearic acid, arachidic acid, behenic acid, lignoceric acid, cerotic acid, montanic acid, melissic acid, and ceroplastic acid.

Examples of the unsaturated fatty acid may include undecylenic acid, oleic acid, elaidic acid, cetoleic acid, erucic acid, brassidic acid, sorbic acid, linoleic acid, linolenic acid, arachadonic acid, propiolic acid, and stearolic acid.

Among these fatty acids, particularly preferred are palmitic acid, stearic acid, and 12-hydroxystearic acid.

Examples of the hydroxides, inorganic acid salts, carboxylic acid salts, or alkoxides of alkali metals or alkaline earth metals as the formaldehyde or formic acid trapping agent may include hydroxides of sodium, potassium, magnesium, calcium, barium, and the like, carbonates thereof, phosphoric acid salts thereof, silicic acid salts thereof, boric acid salts thereof, and carboxylic acid salts thereof.

The carboxylic acid salts exclude the fatty acid calcium salts above.

Examples of carboxylic acids corresponding to the carboxylic acid salts may include saturated or unsaturated aliphatic carboxylic acids having 10 to 36 carbon atoms, and these carboxylic acids may have an optionally substituted hydroxyl group.

Examples of the saturated aliphatic carboxylic acid may include capric acid, lauric acid, myristic acid, palmitic acid, stearic acid, arachidic acid, behenic acid, lignoceric acid, cerotic acid, montanic acid, melissic acid, and ceroplastic acid.

Examples of the unsaturated aliphatic carboxylic acid may include undecylenic acid, oleic acid, elaidic acid, cetoleic acid, erucic acid, brassidic acid, sorbic acid, linoleic acid, linolenic acid, arachadonic acid, propiolic acid, and stearolic acid.

Examples of alkoxides may include methoxides of the metals and ethoxides thereof.

As the formaldehyde or formic acid trapping agent, the amount of the compounds and polymers containing formaldehyde-reactive nitrogen, fatty acid calcium salts, hydroxides, inorganic acid salts, carboxylic acid salts, or alkoxides of alkali metals or alkaline earth metals to be added is in the range of preferably 0.01 to 1 part by mass, and more preferably 0.02 to 0.5 parts by mass based on 100 parts by mass of the (A) polyacetal copolymer. At an amount of 0.01 to 1 part by mass, in the polyacetal resin composition according to the present embodiment, the thermal stability during the molding process is improved, the amount of formaldehyde to be produced in the molded article is reduced, and higher heat aging resistance is provided.

Examples of the weathering stabilizer may include hindered amine stabilizers and ultraviolet absorbing agents.

Examples of the hindered amine stabilizers may include piperidine derivatives having a sterically hindered group. Examples thereof may include ester group-containing piperidine derivatives, ether group-containing piperidine derivatives, amide group-containing piperidine derivatives, and piperidine derivative polycondensates having a high molecular weight.

Examples of the ester group-containing piperidine derivatives may include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-benzoyloxy-2,2,6,6-tetramethylpiperidine, 4-phenylcarbamoxy-2,2,6,6-tetramethylpiperidine, bis(2,2,6,6-tetramethyl-4-piperidyl)oxalato, bis(2,2,6,6-tetramethyl-4-piperidyl)malonate, bis(1,2,2,6,6-pentamethyl-4-piperidyl)[[3,5-bis(1,1-dimethylethyl)-4-hydroxyphenyl]methyl]butylmalonate, bis(2,2,6,6-tetramethyl-4-piperidyl)adipate, bis(1,2,2,6,6-pentamethyl-4-piperidyl)adipate, bis(1-methyl-2,2,6,6-tetramethyl-4-piperidyl)adipate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, decanedioic acid bis(2,2,6,6-tetramethyl-1-(octyloxy)-4-piperidinyl)ester, bis(2,2,6,6-tetramethyl-4-piperidyl)terephthalate, tris(2,2,6,6-tetramethyl-4-piperidyl)benzene-1,3,5-tricarboxylate, and tetrakis(1,2,2,6,6-pentamethyl-4-piperidyl)-1,2,3,4-butanetetracarboxylate.

Examples of the ether group-containing piperidine derivatives may include 4-methoxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, and 1,2-bis(2,2,6,6-tetramethyl-4-piperidyloxy)ethane.

Examples of the amide group-containing piperidine derivatives may include 4-(phenylcarbamoyloxy)-2,2,6,6-tetramethylpiperidine and bis(2,2,6,6-tetramethyl-4-piperidyl)hexamethylene-1,6-dicarbamate.

Examples of high molecular weight piperidine derivative polycondensates may include succinic acid dimethyl-1-(2-hydroxyethyl)-4-hydroxy-2,2,6,6-tetramethylpiperidine polycondensates; condensates of 1,2,3,4-butanetetracarboxylic acid, 1,2,2,6,6-pentamethyl-4-piperidinol, and tridecylalcohol; and condensates of 1,2,3,4-butanetetracarboxylic acid, 1,2,2,6,6-pentamethyl-4-piperidinol, and $\beta,\beta,\beta',\beta'$-tetramethyl-3,9-(2,4,8,10-tetraoxaspiro[5,5]undecane)-diethanol.

One of the various hindered amine stabilizers may be used alone, or two or more thereof may be used in combination.

Among these, preferred hindered amine stabilizers are bis (1,2,2,6,6-pentamethyl-4-piperidinyl)sebacate, bis-(N-methyl-2,2,6,6-tetramethyl-4-piperidinyl)sebacate, bis(2,2,6,6-tetramethyl-4-piperidinyl)sebacate, and condensates of 1,2,3,4-butanetetracarboxylic acid, 1,2,2,6,6-pentamethyl-4-piperidinol, and β,β,β',β',-tetramethyl-3,9-[2,4,8,10-tetraoxaspiro(5,5)undecane]diethanol.

The content of the hindered amine stabilizer is preferably 0.01 to 5 parts by mass, more preferably 0.1 to 2 parts by mass, and still more preferably 0.1 to 1.5 parts by mass based on 100 parts by mass of the (A) polyacetal copolymer.

Preferably, the (A) polyacetal copolymer resin further contains an ultraviolet absorbing agent as the weathering stabilizer. These provide an effect of improving weatherability (photostability) in the molded article obtained from the polyacetal resin composition according to the present embodiment.

Examples of the ultraviolet absorbing agent may include benzotriazole compounds, benzophenone compounds, oxanilide compounds, and hydroxyphenyl-1,3,5-triazine compound.

Examples of the benzotriazole compound may include benzotriazoles having a hydroxyl group and an alkyl group (preferably $C_{1-6}$ alkyl group)-substituted aryl group such as 2-(2'-hydroxy-5'-methylphenyl)benzotriazole, 2-(2'-hydroxy-3',5'-di-t-butylphenyl)benzotriazole, 2-(2'-hydroxy-3',5'-di-t-amylphenyl)benzotriazole, and 2-(2'-hydroxy-3',5'-diisoamylphenyl)benzotriazole; benzotriazoles having a hydroxyl group and an aralkyl group or an aryl group-substituted aryl group such as 2-[2'-hydroxy-3',5'-bis(α,α-dimethylbenzyl)phenyl]benzotriazole; and benzotriazoles having a hydroxyl group and an alkoxy group (preferably $C_{1-12}$ alkoxy group)-substituted aryl group such as 2-(2'-hydroxy-4'-octoxyphenyl)benzotriazole.

Preferred benzotriazole compound are benzotriazoles having a hydroxyl group and a $C_{3-6}$ alkyl group-substituted $C_{6-10}$ aryl group (particularly phenyl group) and benzotriazoles having a hydroxyl group and a $C_{6-10}$ aryl-$C_{1-6}$ alkyl group (particularly phenyl $C_{1-4}$ alkyl group)-substituted aryl group.

Examples of the benzophenone compound may include benzophenones having a plurality of hydroxyl groups; and benzophenones having a hydroxyl group and an alkoxy group (preferably $C_{1-16}$ alkoxy group).

Examples of the benzophenones having a plurality of hydroxyl groups may include di-, tri-, or tetrahydroxybenzophenone such as 2,4-dihydroxybenzophenone; and benzophenones having a hydroxyl group and a hydroxyl-substituted aryl or aralkyl group such as 2-hydroxy-4-benzyloxybenzophenone.

Examples of benzophenones having a hydroxyl group and an alkoxy group may include 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone.

Preferred benzophenone compounds are benzophenones having a hydroxyl group and a hydroxyl group-substituted $C_{6-10}$ aryl group or $C_{6-10}$ aryl-$C_{1-4}$ alkyl group, and particularly, more preferred are benzophenones having a hydroxyl group and a hydroxyl group-substituted phenyl $C_{1-2}$ alkyl group.

Examples of the oxanilide compounds may include N-(2-ethylphenyl)-N'-(2-ethoxy-5-t-butylphenyl)oxalic acid diamide, and N-(2-ethylphenyl)-N'-(2-ethoxy-phenyl)oxalic acid diamide.

Examples of the hydroxyphenyl-1,3,5-triazine compounds may include 2,4-diphenyl-6-(2-hydroxyphenyl)-1,3,5-triazine, 2,4-diphenyl-6-(2,4-dihydroxyphenyl)-1,3,5-triazine, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, and 2,4-diphenyl-6-(2-hydroxy-4-dodecyloxyphenyl)-1,3,5-triazine.

Among the compounds as the ultraviolet absorbing agent described above, preferable are benzotriazole compounds, and more preferred are 2-[2'-hydroxy-3',5'-bis(α,α-dimethylbenzyl)phenyl]benzotriazole.

The amount of the ultraviolet absorbing agent to be added is preferably 0.1 to 5 parts by mass, more preferably 0.1 to 2 parts by mass, and still more preferably 0.1 to 1.5 parts by mass based on 100 parts by mass of the (A) polyacetal copolymer resin.

In the case where the polyacetal resin composition according to the present embodiment contains the ultraviolet absorbing agent and the hindered amine stabilizer, the proportion of the ultraviolet absorbing agent to the hindered amine stabilizer, i.e., ultraviolet absorbing agent/hindered amine stabilizer (mass ratio) is in the range of preferably 10/90 to 80/20, more preferably 10/90 to 70/30, and still more preferably 20/80 to 60/40.

((B) Aluminum Pigment)

The (B) aluminum pigment that forms the polyacetal resin composition according to the present embodiment has a coin-like or flake-like flat shape, a volume average particle size $D_{50}$ of 15 to 50 μm, an average surface roughness Ra of 20 to 50 nm, and an average height Rc of depressions and projections in a surface roughness curve of 80 to 200 nm.

Preferably, the surface of the (B) aluminum pigment has a proper oxide coating. If the surface of the (B) aluminum pigment has a proper oxide coating, high reflectance unique to aluminum can be kept, and anticorrosiveness and stability over time of the particle can be kept.

The purity of the (B) aluminum pigment is not particularly limited, and other metal may be contained as impurities or an alloy component as long as the other metal does not impair the effects of the invention. Examples of the impurities or alloy component may include Si, Fe, Cu, Mn, Mg, and Zn.

The (B) aluminum pigment can be produced by a known method.

For example, atomized powder, machined powder, foil powder, vapor deposited powder, or aluminum powder obtained by other method is classified in advance by primary classification. In the co-presence of a powder pulverizing body containing a powder pulverizing aid and a solvent, the classified powder is subjected to wet powder pulverizing by a ball mill, an Attritor, a planetary ball mill, a vibration mill, or the like. The pulverized product is sieved under a wet condition, and the obtained product is subjected to solid liquid separation by a filter press to obtain the (B) aluminum pigment. Thereby, an aluminum pigment can be produced in which uneven broken surfaces existing in ends of the flake are reduced.

If the powder pulverizing body used here is excessively added, the particle contains a large amount of oxygen. For this reason, the amount of the powder pulverizing body to be used is preferably as small as possible.

The (B) aluminum pigment has a coin-like or flake-like flat shape.

If the (B) aluminum pigment has a coin-like or flake-like flat shape, the (B) aluminum pigment is easily uniformly dispersed in the polyacetal resin composition according to the present embodiment. Accordingly, luminance of the molded article can be efficiently increased by addition of a small amount of the (B) aluminum pigment.

The content of the (B) aluminum pigment is 0.1 to 10 parts by mass, preferably 0.2 to 6 parts by mass, and more preferably 0.3 to 4 parts by mass based on 100 parts by mass of the (A) polyacetal copolymer resin.

If the content of the (B) aluminum pigment is controlled within the range, the molded article of the polyacetal resin composition according to the present embodiment can keep rigidity and impact resistance that are the mechanical properties that the polyacetal resin intrinsically has, have high appearance properties, and demonstrate stable luminance without inconsistencies in density.

The volume average particle size ($D_{50}$) of the (B) aluminum pigment) is in the range of 15 to 50 μm, preferably 15 to 45 μm, and more preferably 15 to 40 μm as describe above.

By use of the (B) aluminum pigment having the average particle size above, the molded article of the polyacetal resin composition according to the present embodiment has a preferred state of a metallic gloss.

In the (B) aluminum pigment, the proportion of the particle having a particle size of not more than 10 μm is in the range of preferably 4 to 40% by volume, more preferably 6 to 30% by volume, and still more preferably 6 to 25% by volume.

If the proportion of the particle having a particle size of not more than 10 μm is in the range of 4 to 40% by volume, the molded article of the polyacetal resin composition according to the present embodiment has more preferred ranges of the metallic gloss, gloss level change according to the viewing angle, and the amount of formaldehyde to be produced.

Here, the volume average particle size of the (B) aluminum pigment and the content of the particle having a particle size of not more than 10 μm (% by volume) can be measured by the method described in Example later.

The (B) aluminum pigment has a surface average roughness Ra of 20 to 50 nm.

The (B) aluminum pigment has an average height Rc of depressions and projections in a surface roughness curve of 80 to 200 nm.

If Ra and Rc are controlled within the range of the numeric values above, the molded article of the polyacetal resin composition having small gloss level change according to the viewing angle can be obtained.

In the (B) aluminum pigment, the average surface roughness Ra and the average height Rc of depressions and projections in a surface roughness curve can be calculated by the following method.

As a method for observing the shape of the surface of the (B) aluminum pigment, an atomic force microscope (hereinafter, abbreviated to an AFM) is used.

First, as a pre-treatment, a sample of the (B) aluminum pigment is ultrasonically washed with excessive methanol and chloroform, vacuum dried, and dispersed again in acetone. The dispersion is dropped onto a Si wafer, and naturally dried.

In determination of the surface roughness by the AFM, using an aluminum pigment not overlaying other aluminum pigment, a surface roughness curve (line profile of surface depressions and projections) per field of a 5 μm square is measured by 300 scans. The arithmetic average roughness of the surface roughness curve (arithmetic average of the absolute value of the height within the reference length of 5 μm) is determined, and the arithmetic average roughness is determined in three or more fields. Further, the arithmetic average value of the determined the arithmetic average roughnesses is defined as an "average surface roughness Ra (nm)." The terms concerning the surface roughness are based on JIS-B-0660: 1998.

In the aluminum pigment, the average height Rc of depressions and projections in a surface roughness curve is represented by the sum of the average value of the absolute values of peak heights in the surface roughness curve and the average value of the absolute values of bottom depths in the surface roughness curve in the surface roughness curve measured for Ra. Specifically, three or more fields of the arithmetic average heights in the surface roughness curve are measured, and further arithmetically averaged to determine the average height Rc.

Hereinafter, a method for calculating the average surface roughness Ra and the average height Rc of depressions and projections in a surface roughness curve in (B) aluminum pigment will be specifically described.

(Average Surface Roughness: Ra)

In observation of the surface of the aluminum pigment, a Nano Scope IV D3100 (made by Digital Instruments, Inc.) can be used as an atomic force microscope, for example.

First, as a pre-treatment, the (B) aluminum pigment to be measured is ultrasonically washed with excessive methanol and chloroform, vacuum dried, and dispersed again in acetone. The dispersion is dropped onto a Si wafer, and naturally dried.

In determination of the surface roughness by the AFM, using an aluminum pigment not overlaying other aluminum pigment, a surface roughness curve (line profile of surface depressions and projections) per field of a 5 μm square is measured by 300 scans. The arithmetic average roughness of the surface roughness curve (arithmetic average of the absolute value of the height at a reference length of 5 μm, for example) is determined.

FIG. 1 shows a surface roughness curve for calculating the average surface roughness Ra. In FIG. 1, m represents the average value of depressions and projections on the surface, and l represents the reference length.

Specifically, at a reference length of 5 μm, for example, the arithmetic average of the absolute values of the heights is determined by the following equation (i).

[Expression 1]

$$R_a = \frac{1}{l}\int_0^l |y(x)|\,dx \qquad (i)$$

(Average Height of Depressions and Projections in Surface Roughness Curve: Rc)

Using the surface roughness curve determined in calculation of the "average surface roughness: Ra," the sum of the average value of the absolute values of the peak heights in the surface roughness curve and the average value of the absolute values of the bottom depths in the surface roughness curve is determined by measurement of three or more fields and calculation. Further, the arithmetic average of the determined sums in the three or more fields is determined, and defined as Rc.

Figure 2:
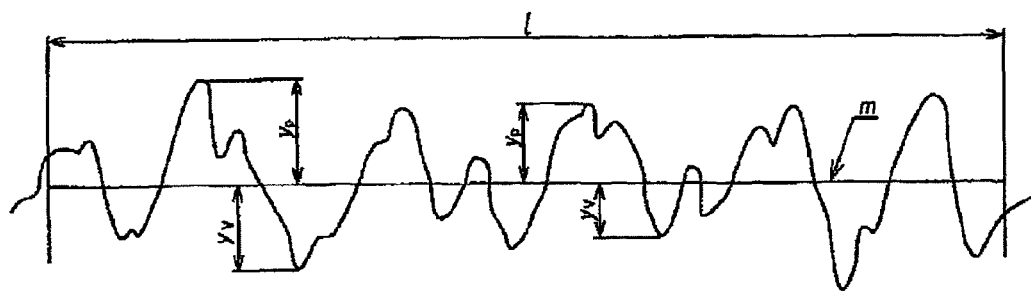
FIG. 2 shows a surface roughness curve for calculating an average height Rc of depressions and projections in a surface roughness curve.

FIG. 2 shows a surface roughness curve for calculating the average height Rc of depressions and projections in a surface roughness curve. In FIG. 2, m represents the average value of the depressions and projections on the surface, and l represents the reference length.

Specifically, the average height Rc is determined by the following equation (ii).

Here, n is the number of peaks and bottoms of the surface roughness curve within the reference length.

[Expression 2]

$$R_c = \frac{1}{n}\sum_{i=1}^{n} |y_{pi}| + \frac{1}{n}\sum_{j=1}^{n} |y_{vj}| \quad \text{(ii)}$$

In the polyacetal resin composition according to the present embodiment, the average surface roughness Ra of the (B) aluminum pigment is in the range of 20 to 50 nm, and preferably 25 to 50 nm, and the average height Rc of depressions and projections in a surface roughness curve is in the range of 80 to 200 nm, and preferably 90 to 200 nm. If Ra and Rc are within the ranges of the numeric values above, a polyacetal resin composition having a high metallic gloss and small gloss level change according to the viewing angle is obtained.

A known material uses a pigment having Ra of not more than 20 nm, and Rc of not more than 80 nm. The composition obtained in this case has a high metallic gloss, but gloss level change according to the viewing angle is large. Accordingly, the known material is not preferable.

Preferably, the surface of the (B) aluminum pigment is modified with a fatty acid having 10 to 30 carbon atoms.

In modification of the surface of the (B) aluminum pigment, the amount of the fatty acid to be used is preferably 0.3 to 10 parts by mass, and more preferably 0.5 to 8 parts by mass based on 100 parts by mass of the aluminum pigment. If the amount of the fatty acid to be used is controlled within the range, the surface of the (B) aluminum pigment can be well modified, and the stability in mixing the aluminum pigment with the polyacetal copolymer can be enhanced to improve the appearance of the molded article.

As the fatty acid having 10 to 30 carbon atoms, preferred are oleic acid, lauric acid, myristic acid, palmitic acid, behenic acid, and stearic acid, and more preferred are oleic acid, behenic acid, and stearic acid.

In order to assist modification of the surface of the (B) aluminum pigment, a small amount of a thermosetting resin may be used in combination. Examples of such a thermosetting resin may include unsaturated polyester resins and epoxy resins.

The surface of the (B) aluminum pigment can be modified by mixing the (B) aluminum pigment, the fatty acid, and the thermosetting resin. A mixer usually used can be used in mixing the aluminum pigment, the fatty acid, and when necessary, the thermosetting resin.

Examples of the mixer may include a ribbon blender, a Henschel mixer, and a tumbler mixer. In order to efficiently modify the surface of the (B) aluminum pigment, these mixers are preferably an apparatus enabling heating depending on the melting point of the fatty acid to be used. The mixing is preferably performed on a mild condition so as not to break the (B) aluminum pigment.

((C) Formaldehyde Inhibitor)

The polyacetal resin composition according to the present embodiment preferably further contains the (C) formaldehyde inhibitor.

Examples of the formaldehyde inhibitor may include aminotriazine compounds, guanamine compounds, urea compounds, and carboxylic acid hydrazide compounds.

One of these formaldehyde inhibitors may be used alone, two or more thereof may be used in combination.

Examples of the aminotriazine compounds may include a part of the components described as the formaldehyde trapping agent. Examples thereof may include melamine; melamine condensates such as melam, melem, and melon; melamine resins such as melamine formaldehyde resins; and N-hydroxyarylalkylmelamine compounds such as N,N',N"-mono-, bis-, tris-, tetrakis-, pentakis-, or hexakis(o-, m- or p-hydroxyphenylmethyl)melamine.

Examples of the guanamine compound may include aliphatic guanamine compounds such as valeroguanamine, caproguanamine, heptanoguanamine, capryloguanamine, and stearoguanamine; alkylene bisguanamines such as succinoguanamine, glutaroguanamine, adipoguanamine, pimeloguanamine, suberoguanamine, azeloguanamine, and sebacoguanamine; alicyclic guanamine compounds such as cyclohexane carboguanamine, norbornene carboguanamine, cyclohexene carboguanamine, norbornane carboguanamine and functional group-substituted derivatives thereof; aromatic guanamine compounds such as benzoguanamine, α- or β-naphthoguanamine, and functional group-substituted derivatives thereof; polyguanamines such as phthaloguanamine, isophthaloguanamine, terephthaloguanamine, naphthalene diguanamine, and biphenylene diguanamine; aralkyl or aralkylene guanamines such as phenylacetoguanamine, β-phenylpropioguanamine, and o-, m-, or p-xylylenebisguanamine; and hetero atom-containing guanamine compounds such as acetal group-containing guanamines, dioxane ring-containing guanamines, tetraoxospiro ring-containing guanamines, isocyanuric ring-containing guanamines.

Examples of the functional group-substituted derivatives in the alicyclic guanamine compound may include derivatives in which a cycloalkane residue has 1 to 3 substituted functional groups such as an alkyl group, a hydroxy group, an amino group, an acetoamino group, a nitrile group, a carboxy group, an alkoxycarbonyl group, a carbamoyl group, an alkoxy group, a phenyl group, a cumyl group, and a hydroxyphenyl group.

Examples of the functional group-substituted derivatives in the aromatic guanamine compound may include derivatives in which a phenyl residue of benzoguanamine or a naphthyl residue of naphthoguanamine has 1 to 5 substituted functional groups such as an alkyl group, a hydroxy group, an amino group, an acetoamino group, a nitrile group, a carboxy group, an alkoxycarbonyl group, a carbamoyl group, an alkoxy group, a phenyl group, a cumyl group, and a hydroxyphenyl group. Examples of such aromatic guanamine compounds may include o-, m-, or p-toluguanamine, o-, m-, or p-xyloguanamine, o-, m-, or p-phenylbenzoguanamine, o-, m-, or p-hydroxybenzoguanamine, 4-(4'-hydroxyphenyl)benzoguanamine, o-, m-, or p-nitrilebenzoguanamine, 3,5-dimethyl-4-hydroxybenzoguanamine, and 3,5-di-t-butyl-4-hydroxybenzoguanamine.

Examples of the acetal group-containing guanamines may include 2,4-diamino-6-(3,3-dimethoxypropyl)-s-triazine.

Examples of the dioxane ring-containing guanamines may include [2-(4'-6'-diamino-s-triazine-2'-yl)ethyl]-1,3-dioxane, and [2-(4'-6'-diamino-s-triazine-2'-yl)ethyl]-4-ethyl-4-hydroxymethyl-1,3-dioxane.

Examples of the tetraoxospiro ring-containing guanamines may include CTU-guanamine and CMTU-guanamine.

Examples of the isocyanuric ring-containing guanamines may include 1,3,5-tris[2-(4',6'-diamino-s-triazine-2'-yl)ethyl]isocyanurate, and 1,3,5-tris[3-(4',6'-diamino-s-triazine-2'-yl)propyl]isocyanurate.

Examples of the urea compounds may include chain urea compounds and cyclic urea compounds.

Examples of the chain urea compounds may include condensates of urea and formaldehyde such as biurea, biuret, and formitrogen, and polyalkylene or arylene urea such as polynonamethyleneurea.

Examples of the cyclic urea compounds may include hydantoins, crotylidene diurea, acetyleneurea, mono-, di-, tri-, or tetraalkoxymethyl glycoluril such as mono-, di-, tri-, or tetramethoxymethyl glycoluril, cyanuric acid, isocyanuric acid, uric acid, and urazole.

Examples of the hydantoins may include hydantoin, 5-methylhydantoin, 5-ethylhydantoin, 5-isopropylhydantoin, 5-phenylhydantoin, 5-benzylhydantoin, 5,5-dimethylhydantoin, 5,5-pentamethylenehydantoin, 5-methyl-5-phenylhydantoin, 5,5-diphenylhydantoin, 5-(o-, m-, or p-hydroxyphenyl)hydantoin, 5-(o-, m-, or p-aminophenyl)hydantoin, allantoin, 5-methylallantoin, and metal salts such as Al salts of allantoin such as dihydroxyaluminum allantoin salts.

Examples of the carboxylic acid hydrazide compound may include aliphatic carboxylic acid hydrazide compounds, alicyclic carboxylic acid hydrazide compounds, and aromatic carboxylic acid hydrazide compounds.

Examples of the aliphatic carboxylic acid hydrazide compounds may include monocarboxylic acid hydrazides such as lauric acid hydrazide, stearic acid hydrazide, 12-hydroxystearic acid hydrazide, and 1,2,3,4-butanetetracarboxylic acid hydrazide; and polycarboxylic acid hydrazides such as succinic acid mono- or dihydrazide, glutaric acid mono- or dihydrazide, adipic acid mono- or dihydrazide, pimelic acid mono- or dihydrazide, suberic acid mono- or dihydrazide, azelaic acid mono- or dihydrazide, sebacic acid mono- or dihydrazide, dodecanedioic acid mono- or dihydrazide, hexadecanedioic acid mono- or dihydrazide, eicosandioic acid mono- or dihydrazide, and 7,11-octadecadiene-1,18-dicarbohydrazide.

Examples of the alicyclic carboxylic acid hydrazide compounds may include monocarboxylic acid hydrazides such as cyclohexanecarboxylic acid hydrazide; and polycarboxylic acid hydrazides such as dimer acid mono- or dihydrazide, trimer acid mono, di or trihydrazide, 1,2-, 1,3- or 1,4-cyclohexanedicarboxylic acid mono- or dihydrazide, and cyclohexanetricarboxylic acid mono-, di-, or trihydrazide.

Examples of the aromatic carboxylic acid hydrazide compounds may include monocarboxylic acid hydrazides such as benzoic acid hydrazide and functional group-substituted derivatives thereof, and α- or β-naphthoic acid hydrazide and functional group-substituted derivatives thereof; and polycarboxylic acidshydrazides such as isophthalic acid mono- or dihydrazide, terephthalic acid mono- or dihydrazide, 1,4- or 2,6-naphthalenedicarboxylic acid mono- or dihydrazide, 3,3'-, 3,4'- or 4,4'-diphenyldicarboxylic acid mono- or dihydrazide, diphenyletherdicarboxylic acid mono- or dihydrazide, diphenylmethanedicarboxylic acid mono- or dihydrazide, diphenylethanedicarboxylic acid mono- or dihydrazide, diphenoxyethanedicarboxylic acid mono- or dihydrazide, diphenylsulfonedicarboxylic acid mono- or dihydrazide, diphenylketonedicarboxylic acid mono- or dihydrazide, 4,4"-terphenyldicarboxylic acid mono- or dihydrazide, 4,4'''-quaterphenyldicarboxylic acid mono- or dihydrazide, 1,2,4-benzenetricarboxylic acid mono-, di-, or trihydrazide, pyromellitic acid mono-, di-, tri-, or tetrahydrazide, and 1,4,5,8-naphthoic acid mono-, di-, tri-, or tetrahydrazide.

Examples of the benzoic acid hydrazide and functional group-substituted derivatives thereof may include derivatives in which a phenyl residue of benzoguanamine has 1 to 5 substituted functional groups such as an alkyl group, a hydroxy group, an acetoxy group, an amino group, an acetoamino group, a nitrile group, a carboxy group, an alkoxycarbonyl group, a carbamoyl group, an alkoxy group, a phenyl group, a benzyl group, a cumyl group, and a hydroxyphenyl group such as o-, m-, or p-methylbenzoic acid hydrazide, 2,4-, 3,4-, 3,5- or 2,5-dimethylbenzoic acid hydrazide, o-, m-, or p-hydroxybenzoic acid hydrazide, o-, m-, or p-acetoxybenzoic acid hydrazide, 4-hydroxy-3-phenylbenzoic acid hydrazide, 4-acetoxy-3-phenylbenzoic acid hydrazide, 4-phenylbenzoic acid hydrazide, 4-(4'-phenyl)benzoic acid hydrazide, 4-hydroxy-3,5-dimethylbenzoic acid hydrazide, and 4-hydroxy-3,5-di-t-butylbenzoic acid hydrazide.

Examples of the α- or β-naphthoic acid hydrazide and functional group-substituted derivatives thereof may include 3-hydroxy-2-naphthoic acid hydrazide and 6-hydroxy-2-naphthoic acid hydrazide.

The (C) formaldehyde inhibitor can also be used in a form thereof carried by a layered substance or a porous substance (such as hydrotalcite, montmorillonite, silica gel, alumina, titania, zirconia, sepiolite, smectite, palygorskite, imogolite, zeolite, and activated carbon).

Among the (C) formaldehyde inhibitors, preferably used are aminotriazine compounds and guanamine compounds, and particularly aromatic guanamine compounds; urea compound, particularly cyclic urea compounds; carboxylic acid hydrazide compound, particularly aliphatic carboxylic acid hydrazide compounds and aromatic carboxylic acid hydrazide compounds.

Among the (C) formaldehyde inhibitors, particularly preferable are aliphatic carboxylic acid hydrazide compounds, and more preferable are use of the combined system of the aliphatic carboxylic acid hydrazide compounds enabling reduction in the melting point of the aliphatic carboxylic acid hydrazide compound compared to the single system thereof.

The combined system means a mixture of the carboxylic acid hydrazide (C-1) and the carboxylic acid hydrazide (C-2) different from the (C-1).

In the case where the mixture is used as the formaldehyde inhibitor, the melting point of the mixture measured by a differential thermal analyzer satisfies the following expressions (1) and (2), the polyacetal resin composition according to the present embodiment can have a high metallic gloss, production of the formaldehyde can be suppressed, high weld performance and mechanical properties that the polyacetal resin intrinsically has can be kept, the repeated impact resistance after aging can be enhanced, and the amount of formaldehyde to be produced in recycling can be suppressed. Further, mold deposit properties under the condition in which a filling rate into the metal mold is low can be improved.

$$T1<T2 \quad (1)$$

$$T1<T3 \quad (2)$$

wherein T1 represents a temperature (° C.) at which the amount of heat to be absorbed shows the vertex of the largest endothermic peak among endothermic peaks obtained by heating and cooling the mixture of the carboxylic acid hydrazide (C-1) and the carboxylic acid hydrazide (C-2) different from the (C-1) according to a predetermined temperature program below, and raising the temperature at a rate of 2.5° C./min until the mixture melts;

T2 represents a temperature (° C.) at which the amount of heat to be absorbed shows the vertex of the largest endothermic peak among endothermic peaks obtained by heating and cooling the carboxylic acid hydrazide (C-1) according to the predetermined temperature program, and raising the temperature at a rate of 2.5° C./min until the carboxylic acid hydrazide (C-1) melts; and T3 represents a temperature (° C.) at which the amount of heat to be absorbed shows the vertex of the largest endothermic peak among endothermic peaks obtained by heating and cooling the polyacetal copolymer resin (A) according to a predetermined temperature program, and raising the temperature at a rate of 2.5° C./min until the polyacetal copolymer resin (A) melts.

The "predetermined temperature program" used for determination of T1 and T2 means a temperature program comprising raising the temperature at a rate of 2.5° C./min from a temperature lower than the endothermic peak temperature of the mixture or the carboxylic acid hydrazide (C-1) to a temperature at which the mixture or the carboxylic acid hydrazide (C-1) melts, keeping the temperature for 2 minutes, and then, lowering the temperature to 100° C. at a temperature falling rate of 10° C./min.

The predetermined temperature program for polyacetal copolymer resin (A) used for determination of T3 means a temperature program comprising raising a temperature at a rate of 320° C./min from a temperature lower than the endothermic peak temperature of the polyacetal copolymer resin (A) to 200° C., keeping the temperature at 200° C. for 2 minutes, and lowering the temperature at a rate of 10° C./min to 100° C.

As a result of examination to meet the condition in which the expressions (1) and (2) are satisfied, a preferred carboxylic acid hydrazide compound is aliphatic carboxylic acid dihydrazide. Specifically, preferable is a combination of at least two selected from the group consisting of succinic acid dihydrazide, glutaric acid dihydrazide, adipic acid dihydrazide, pimelic acid dihydrazide, suberic acid dihydrazide, azelaic acid dihydrazide, sebacic acid dihydrazide, dodecanedioic acid dihydrazide, and hexadecanedioic acid dihydrazide, and more preferable is a combination of at least two selected from the group consisting of adipic acid dihydrazide, sebacic acid dihydrazide, and dodecanedioic acid dihydrazide.

The content of the (C): formaldehyde inhibitor that forms polyacetal resin composition according to the present embodiment is 0.01 to 5 parts by mass, preferably 0.01 to 2 parts by mass, and more preferably 0.02 to 1 part by mass based on 100 parts by mass of the polyacetal copolymer resin.

If the amount of the formaldehyde inhibitor to be added is not less than 0.01 parts by mass, the effect of suppressing formaldehyde is enhanced. If the amount of the formaldehyde inhibitor to be added is not more than 5 parts by mass, a mold deposit can be produced.

(Other Component)

In order to further enhance designability, the polyacetal resin composition according to the present embodiment can contain a variety of colorants as a complementary color pigment.

Examples of the colorant may include organic pigments and inorganic pigments, but not particularly limited thereto. One of the colorants or may be used, or two or more thereof may be used in combination.

Examples of the organic pigments may include phthalocyanine pigments, condensation azo pigments, azo lake pigments, quinacridone pigments, dioxazine pigments, isoindolinone pigments, and condensation polycyclic pigments.

Examples of the inorganic pigment may include simple oxides such as zinc oxide, titanium dioxide, red iron oxide, chromium oxide, and iron black; sulfides such as cadmium yellow, cadmium orange, and cadmium red; chromic acid salts such as chrome yellow, zinc yellow, chromium vermilion; ferrocyanide such as Prussian blue; silicic acid salts such as ultramarine; and inorganic coloring agents such as carbon black and metal powder.

The amount of the colorant to be added is in the range of preferably 0.001 to 5 parts by mass, and more preferably 0.001 to 3 parts by mass based on 100 parts by mass of the (A) polyacetal copolymer. At an amount within the range, an effect of improving the designability of the molded article is obtained.

Further, if desired, the polyacetal resin composition according to the present embodiment may contain a lubricant, a variety of inorganic fillers, other thermoplastic resins, a softener, a nucleator, and a mold release agent used in the conventional polyacetal resin composition in the range in which the object of the present invention is not impaired.

[Method for Producing Polyacetal Resin Composition]

The polyacetal resin composition according to the present embodiment is obtained by mixing the raw materials while a part of the raw materials are molten by a melt kneading machine usually used.

Examples of the melt kneading machine may include a kneader, a roll mill, a single screw extruder, a twin screw extruder, and a mutli screw extruder.

The melt kneading temperature is preferably 180 to 230° C. More preferably, an atmosphere within the system is replaced by an inert gas, or degassed by a single-stage and multi-stage vent in order to keep the quality of the product and the working environment.

In order to enhance uniform dispersibility of the components including the (B) aluminum pigment in the (A) polyacetal copolymer resin, in the case where the (A) polyacetal copolymer resin is pellets, preferably, a part or all of the pellets is ground into powder; using the powder of the (A) polyacetal copolymer resin and a spreading agent when necessary, the stabilizer (the antioxidant, the formaldehyde or formic acid trapping agent, and the weathering stabilizer) and the formaldehyde trapping agent are mixed; next, the (B) aluminum pigment and the complementary color pigment when necessary are mixed, and the obtained mixture is melt kneaded.

In the case where the pellet of the (A) polyacetal copolymer resin is used, preferably, using a spreading agent when necessary, the stabilizer (the antioxidant, the formaldehyde or formic acid trapping agent, and the weathering stabilizer), the formaldehyde trapping agent, and the like are mixed in advance; next, the (B) aluminum pigment and the complementary color pigment when necessary are mixed, and the obtained mixture is melt kneaded. Examples of the spreading agent may include aliphatic hydrocarbons, aromatic hydrocarbons, modified products thereof, a mixture thereof (such as liquid paraffins and mineral oils), and fatty acid esters of polyol. In order to prevent damage to the aluminum pigment in a blending step thereof, the spreading agent is preferably blended in a post step.

Further, in production of the polyacetal resin composition according to the present embodiment, the (A) polyacetal copolymer resin and the stabilizer (at least one selected from the group consisting of the antioxidant, the formaldehyde or formic acid trapping agent, and the weathering stabilizer) can be melt kneaded in advance.

A melt kneading machine usually used can be used for the preparatory kneading. Examples of the melt kneading machine may include a kneader, a roll mill, a single screw extruder, a twin screw extruder, and a multi screw extruder. The temperature at this time is preferably 180 to 230° C. More preferably, an atmosphere within the system is replaced by an inert gas, or degassed by a single-stage and multi-stage vent in order to keep the quality of the product and the working environment.

[Molded Article]

The molded article of the polyacetal resin composition according to the present embodiment is produced using the polyacetal resin composition according to the present embodiment.

Examples of a method for producing a molded article using the polyacetal resin composition according to the present embodiment may include known molding methods such as extrusion molding, injection molding, vacuum molding, blow molding, injection compression molding, decorative molding, gas assist injection molding, foam injection molding, low pressure molding, ultra-thin injection molding (ultra-high speed injection molding), and in-mold composite molding (insert molding, outsert molding).

Particularly, from the viewpoint of quality, production stability, economy, and the like, injection molding, injection compression molding, and a molding method using these and in-mold composite molding in combination are preferred.

Further, by bonding (any method of ultrasonic bonding, high frequency bonding, heat plate bonding, heat press molding, multi-layer injection molding, and multi-layer blow molding can be used.) the polyacetal resin composition according to the present embodiment to a variety of resins including a rubber and/or an elastomer, a molded product having desired properties and a desired appearance and having two or more layers can be produced. Thereby, high performance of the variety of resins (such as impact resistance, sliding properties, and resistance against chemicals) can be given to provide a molded article having an appearance with high designability.

(Properties of Molded Article)

In the molded article obtained by molding the polyacetal resin composition according to the present embodiment, when the measured value at a measured angle of 60° of the gloss level measured according to JIS 28741 is 100%, a measured value at a measured angle of 45° is preferably not less than 50%, more preferably not less than 60%, and still more preferably not less than 65%.

Thereby, a molded article having a good appearance is obtained in which change in the color tone according to the viewing angle is sufficiently small.

[Application]

The molded article of the polyacetal resin composition according to the present embodiment can be used particularly for interior and exterior parts including a mechanical part or a sliding part.

For example, the molded article is used as a part selected from the group consisting of parts included in OA apparatuses, music, video, or information apparatuses, or communication apparatuses, industrial parts included in office furniture or housing apparatuses, and automobile interior and exterior parts. Particularly, the molded article is suitably used as a part selected from the group consisting of parts for handles, switches, and buttons, which need a good appearance.

Further, in order to use the molded article obtained from polyacetal resin composition according to the present embodiment as an exterior part, a metal mold for grain finish is used in molding, or a molded article after molding is subjected to grain finish to give a designed surface to the molded article. Thereby, an effect of having a good appearance is preferably demonstrated.

The polyacetal resin composition according to the present embodiment provides a molded article having a metallic gloss without processing the surface by plating or coating, in which thermal stability and weatherability are high, good mechanical properties (such as tensile properties, impact strength, weld performance) are kept, the amount of formaldehyde to be produced is suppressed, and the appearance properties are good.

Further, the molded article obtained from the polyacetal resin composition according to the present embodiment has good appearance properties as above, and therefore practically has a good appearance without coating. Accordingly, a good appearance with high designability is obtained efficiently without using any solvent. Particularly, the molded article has a high aluminum gloss, and small change in a gloss level according to the viewing angle.

Moreover, the molded article of the polyacetal resin composition according to the present embodiment has high production stability, and can be produced in a good working environment. The molded article is also excellent with regard to cost and an environment.

EXAMPLES

Hereinafter, the present invention will be specifically described using Examples, but the present invention will not be limited to Examples described later.

[(1) Main Raw Materials]

((A) Polyacetal Copolymer Resin)

A product containing the polyacetal copolymer resin and a variety of additives (hereinafter, also referred to as a "prepared polyacetal copolymer resin" in some cases.) was obtained as follows.

In a self-cleaning, twin screw paddle type continuous mixing reactor (screw diameter of 3 inches, L/D=10) with a jacket through which a heating medium could pass, an inside of a reaction container was controlled to be 80° C. Trioxane as the main monomer at 2625 g/h, a predetermined amount of 1,3-dioxolane as the comonomer at 27 to 130 g/h, and methylal as the chain transfer agent were continuously fed (supplied) through a static mixer (made by NORITAKE CO., LIMITED, T type, the element number of 21) into the reaction container of the reactor.

Using a 1% by mass cyclohexane solution of boron trifluoride-di-n-butyletherate as the polymerization catalyst, the catalyst was added into the reaction container such that the catalyst was $2.0 \times 10^{-5}$ mol based on 1 mol of trioxane, and polymerization was performed to obtain polymerization flakes. Note that the amount of the chain transfer agent was 2 to 5 g/h.

The thus-obtained polymerization flakes were pulverized, and put into a triethylamine 1% aqueous solution. The solution was stirred to deactivate the polymerization catalyst.

Then, filtration, washing, and drying were performed to obtain a crude polymer.

As a quaternary ammonium compound, triethyl(2-hydroxyethyl)ammonium formate salt was added to the crude polymer such that the amount in terms of nitrogen was 20 ppm based on 1 part by mass of the obtained crude polymer, and uniformly mixed with the crude polymer. Then, these were dried at 120° C. for 3 hours so as to obtain a dry polymer.

The dry polymer was put into a front stage section in a screw type twin screw extruder with a vent (made by Research Laboratory of Plastics Technology Co., Ltd.; trade name "BT-30", L/D=44, setting temperature of 200° C., the number of rotation of 80 rpm) from a top feeder. 0.5 parts by mass of water was added based on 100 parts by mass of the dry polymer, terminals of the polymer were stabilized at an average residence time of 1 minute, the pressure was reduced, and degassing was performed.

Next, in a rear stage section in the twin screw extruder, 0.05 parts by mass of nylon 6-6 (polyamide 66) as the heat stabilizer and 0.05 parts by mass of calcium stearate were added based on 100 parts by mass of the dry polymer from a side feeder. The dry polymer, nylon 6-6, and calcium stearate were molten and mixed at an average residence time of 1 minute, and granulated.

The granulated product was dried at 80° C. for 3 hours to obtain prepared polyacetal copolymer resins (a-1) to (a-4).

The operation was performed while mixing oxygen was avoided as much as possible during a period from putting the raw materials into the reaction container to extracting an intermediate pellet.

In the prepared polyacetal copolymer resins (a-1) to (a-4), the "content of the comonomer" means the content of the comonomer in terms of trioxane based on 100 mol % of an oxymethylene group $(—CH_2O)_3—)"$ in the polyacetal copolymer resin.

(a-1): content of the comonomer: 4.0 mol %, MFR: 9 g/10 min (according to ASTM D1238-57E), melting point measured on measurement condition for T3=165° C.

(a-2): content of the comonomer: 6.0 mol %, MFR: 9 g/10 min, melting point measured on measurement condition for T3=161° C.

(a-3): content of the comonomer: 1.4 mol %, MFR: 9 g/10 min, melting point measured on measurement condition for T3=170° C.

(a-4): content of the comonomer: 1.0 mol %, MFR: 9 g/10 min, melting point measured on measurement condition for T3=172° C.

((B) Aluminum Pigment)

A (b-1) aluminum pigment was produced as follows.

A blend containing 600 g of atomized aluminum powder (average particle size of 20 μm), 1.2 kg of a mineral spirit, and 10 g of stearic acid were filled into a ball mill having an inner diameter of 30 cm and a length of 35 cm. Using 18 kg of a stainless steel ball having a diameter of 4.8 mm (specific gravity of 7.8), the blend was ground at 60 rpm for 5 hours.

After the grinding was completed, the slurry in the mill was washed out therefrom with the mineral spirit, and sieved by a 400-mesh vibrating sieve. The passed slurry was filtered by a filter, and condensed to obtain an aluminum pigment having a nonvolatile content of 90%.

The obtained aluminum pigment was flake-like. The volume average particle size and % by volume of the particle having a particle size of not more than 10 μm were measured by a laser diffraction particle size distribution analyzer (made by SHIMADZU Corporation, trade name "SALD-1100"). From the 50% value of obtained particle size distribution, the volume average particle size $D_{50}$ of the aluminum pigment was determined, and the proportion of the particle having a particle size of not more than 10 μm was determined from the integrated value of the particle size distribution.

As a result, the proportion of the particle having $D_{50}=32$ μm and the particle size of not more than 10 μm was 8% by volume.

The average surface roughness Ra and the average height Rc of depressions and projections in a surface roughness curve were measured by the method described in the description of the (B) aluminum pigment. The results were Ra=32 nm and Rc=110 nm.

In (b-2) to (b-4) and (b-7) aluminum pigments, an operation was performed according to the same operation as that in (b-1) above except that the particle size of the atomized aluminum powder and the grinding time were changed. Thereby, an aluminum pigment having a different average particle size and different surface roughness was obtained.

(b-2): flake-like, proportion of the particle having $D_{50}=30$ μm and a particle size of not more than 10 μm was 8% by volume, Ra=35 nm, Rc=130 nm (b-3): flake-like, proportion of the particle having $D_{50}=30$ μm and a particle size of not more than 10 μm was 10% by volume, Ra=42 nm, Rc=150 nm (b-4): flake-like, proportion of the particle having $D_{50}=35$ μm and having the particle size of not more than 10 μm was 10% by volume, Ra=65 nm, Rc=250 nm (b-7): flake-like, proportion of the particle having $D_{50}=60$ μm and a particle size of not more than 10 μm was 5% by volume, Ra=35 nm, Rc=150 nm A (b-5) aluminum pigment was produced as follows.

A blend containing 250 g of atomized aluminum powder (average particle size of 10 μm), 1.2 kg of a mineral spirit, and 125 g of oleic acid were filled into a ball mill having an inner diameter of 30 cm and a length of 35 cm. Using 15 kg of a glass bead having a diameter of 3 mm (specific gravity of 2.6), the blend was ground at 60 rpm for 15 hours.

After the grinding was completed, the slurry in the mill was washed out therefrom with the mineral spirit, and sieved by a 400-mesh vibrating sieve. The passed slurry was filtered by a filter, and condensed to obtain an aluminum pigment having a nonvolatile content of 90%.

The obtained aluminum pigment was coin-like. The volume average particle size and % by volume of the particle having a particle size of not more than 10 μm were measured by a laser diffraction particle size distribution analyzer (made by SHIMADZU Corporation, trade name "SALD-1100"). From the 50% value of the obtained particle size distribution, the volume average particle size $D_{50}$ of the aluminum pigment was determined, and the proportion of the particle having a particle size of not more than 10 μm was determined from the integrated value of the particle size distribution.

As a result, the proportion of the particle having $D_{50}=28$ μm and the particle size of not more than 10 μm was 6% by volume.

The average surface roughness Ra and average height Rc of depressions and projections in a surface roughness curve were measured by the method described in the description of the (B) aluminum pigment. The results were Ra=12 nm and Rc=60 nm.

A (b-6) aluminum pigment was produced as follows.

A blend containing 250 g of atomized aluminum powder (average particle size of 6 μm), 1.2 kg of a mineral spirit, and 125 g of oleic acid were filled into a ball mill having an inner diameter of 30 cm and a length of 35 cm. Using 15 kg of a glass bead having a diameter of 3 mm (specific gravity of 2.6), the blend was ground at 60 rpm for 10 hours.

After the grinding was completed, the slurry in the mill was washed out therefrom with the mineral spirit, and sieved by a 400-mesh vibrating sieve. The passed slurry was filtered by a filter, and condensed to obtain an aluminum pigment having a nonvolatile content of 90%.

The obtained aluminum pigment was coin-like. The volume average particle size and % by volume of the particle having a particle size of not more than 10 μm were measured by a laser diffraction particle size distribution analyzer (made by SHIMADZU Corporation, trade name "SALD-1100"). From the 50% value of the obtained particle size distribution, the volume average particle size $D_{50}$ of the aluminum pigment was determined, and the proportion of the particle having a particle size of not more than 10 μm was determined from the integrated value of the particle size distribution.

As a result, the proportion of the particle having $D_{50}=16$ μm and the particle size of not more than 10 μm was 20% by volume.

The average surface roughness Ra and the average height Rc of depressions and projections in a surface roughness curve were measured by the method described in the description of the (B) aluminum pigment. The results were Ra=8 nm and Rc=70 nm.

A (b-8) aluminum pigment was produced as follows.

A commercially available flake-like aluminum powder was dispersed in a mineral spirit, and sieved by a vibrating sieve. The passed slurry was filtered by a filter, and condensed to obtain an aluminum pigment having a nonvolatile content of 90%.

The volume average particle size and % by volume of the particle having a particle size of not more than 10 μm of the obtained aluminum pigment were measured by a laser diffraction particle size distribution analyzer (made by SHIMADZU Corporation, trade name "SALD-1100"). From the 50% value of the obtained particle size distribution, the volume average particle size $D_{50}$ of the aluminum pigment was determined, and the proportion of the particle having a particle size of not more than 10 was determined from the integrated value of the particle size distribution.

As a result, the proportion of the particle having $D_{50}=28$ μm and the particle size of not more than 10 μm was 0.4% by volume.

The average surface roughness Ra and the average height Rc of depressions and projections in a surface roughness curve were measured by the method described in the description of the (B) aluminum pigment. The results were Ra=30 nm and Rc=120 nm.

The aluminum pigment and behenic acid (in the proportion of 2 parts by mass of behenic acid to 100 parts by mass of the aluminum powder) were mixed for 3 minutes by a ribbon blender with a jacket (at 80° C. and 80 rpm).

A (b-9) aluminum pigment was produced as follows.

A commercially available flake-like aluminum powder was dispersed in a mineral spirit, and sieved by a vibrating sieve. The passed slurry was filtered by a filter, and condensed to obtain an aluminum pigment having a nonvolatile content of 90%.

The volume average particle size and % by volume of the particle having a particle size of not more than 10 μm of the obtained aluminum pigment were measured by a laser diffraction particle size distribution analyzer (made by SHIMADZU Corporation, trade name "SALD-1100"). From the 50% value of the obtained particle size distribution, the volume average particle size $D_{50}$ of the aluminum pigment was determined, and the proportion of the particle having a particle size of not more than 10 μm was determined from the integrated value of the particle size distribution.

As a result, the proportion of the particle having $D_{50}=12$ μm and the particle size of not more than 10 μm was 40% by volume.

The average surface roughness Ra and the average height Rc of depressions and projections in a surface roughness curve were measured by the method described in the description of the (B) aluminum pigment. The results were Ra=30 nm and Rc=100 nm.

The aluminum pigment and behenic acid (in the proportion of 2 parts by mass of behenic acid to 100 parts by mass of the aluminum powder) were mixed for 3 minutes by a ribbon blender with a jacket (at 80° C. and 80 rpm).

(b-10): aluminum pigment having a volume average particle size $D_{50}$ at a mixing ratio of (b-8)/(b-9)=90/10 mass=22 μm and the proportion having the particle size of not more than 10 μm=4% by volume (b-11): aluminum pigment having a volume average particle size $D_{50}$ at a mixing ratio of (b-8)/(b-9)=85/15 mass=22 μm and the proportion having the particle size of not more than 10 μm=6% by volume (b-12): aluminum pigment having a volume average particle size $D_{50}$ at a mixing ratio of (b-8)/(b-9)=80/20 mass=21 μm and the proportion having the particle size of not more than 10 μm=8% by volume (b-13): aluminum pigment having a volume average particle size $D_{50}$ at a mixing ratio of (b-8)/(b-9)=70/20 mass=20 μm and the proportion having the particle size of not more than 10 μm=12% by volume (b-14): aluminum pigment having a volume average particle size $D_{50}$ at a mixing ratio of (b-8)/(b-9)=50/50 mass=18 μm and the proportion having the particle size of not more than 10 μm=20% by volume (b-15): aluminum pigment having a volume average particle size $D_{50}$ at a mixing ratio of (b-8)/(b-9)=33/67 mass=16 μm and the proportion having the particle size of not more than 10 μm=25% by volume ((C) Formaldehyde Inhibitor)

(c-1): sebacic acid dihydrazide (made by JAPAN FINECHEM COMPANY, INC.), main peak of the melting point=171° C.

(c-2): adipic acid dihydrazide (made by JAPAN FINECHEM COMPANY, INC.), main peak of the melting point=180° C.

(c-3): dodecanedioic dihydrazide (made by JAPAN FINECHEM COMPANY, INC.), main peak of the melting point=171° C.

(c-4): benzoguanamine (reagent first grade)

(c-5): allantoin (reagent first grade)

(c-6); isophthalic acid dihydrazide (reagent first grade), main peak of the melting point=none (c-7): terephthalic acid dihydrazide (reagent first grade), main peak of the melting point=none The main peak temperature of the melting point of the carboxylic acid dihydrazide (° C.) and the main peak temperature of the mixture in Examples are values obtained by using a differential thermal analyzer (made by PerkinElmer Inc., trade name "DSC7") and measuring a temperature (° C.) at which the amount of heat to be absorbed shows the vertex of the largest endothermic peak (main peak temperature of the melting point) (° C.) among endothermic peaks obtained when heating and cooling were performed and the temperature is raised at a rate of 2.5° C./min according to a predetermined temperature program.

Here, the "predetermined temperature program" means a temperature program comprising raising the temperature at a rate of 2.5° C./min from a temperature lower than the endothermic peak temperature of the compound to a temperature at which the compound melts, keeping the temperature for 2 minutes, and then, lowering the temperature to 100° C. at a temperature falling rate of 10° C./min.

((D) Stabilizer)

(d-1): condensate of 1,2,3,4-butanetetracarboxylic acid, 1,2,2,6,6-pentamethyl-4-piperidinol, β,β, β', β'-tetramethyl-3,9-(2,4,8,10-tetraoxabis[5,5']undecane)diethanol (d-2): triethylene glycol-bis-(3-(3-t-butyl-5-methyl-4-hydroxyphenyl)-propionate)

(d-3): 2-[2'-hydroxy-3',5'-bis(α,α-dimethylbenzyl)phenyl]benzotriazole

[(2) Evaluation Method]
(Mechanical Properties, Fluidity)

Pellets produced in [Examples] and [Comparative Examples] described later were dried at 80° C. for 3 hours. Using a 5-ounce molding machine (made by TOSHIBA MACHINE CO., LTD., trade name "IS-100GN") in which the cylinder temperature was set at 200° C., each of the pellets was formed into a test piece for evaluating physical properties on the condition of a metal mold temperature of 70° C. and the cooling time of 30 seconds. Using the test piece, the test below was performed.

As the mechanical properties, tensile strength, tensile elongation, and Izod impact strength were measured. The fluidity was evaluated using the melt flow rate.
<1> Tensile strength (TS), tensile elongation (TE); measured according to ASTM D638.
<2> Izod impact strength; measured according to ASTM D256.
<3> Melt flow rate (MFR); measured according to ASTM D-1238-57T.
(Amount of Formaldehyde to be Produced (Vda275))

Each of pellets produced in [Examples] and [Comparative Examples] described later was molded using an injection molding machine (made by TOSHIBA MACHINE CO., LTD., trade name "IS-100GN") on the condition of the cylinder temperature of 220° C., the injection time of 15 seconds, the cooling time of 20 seconds, and the metal mold temperature of 77° C. to produce a test piece.

Next, according to the following method (VDA275 method), the amount of formaldehyde emitted from the test piece was determined.

First, 50 mL of distilled water and the test piece (a sheet having a length of 100 mm×width of 40 mm×thickness of 3 mm) were placed in a 500 mL polyethylene container. The container was sealed, and heated at 60° C. for 3 hours.

Subsequently, formaldehyde in distilled water was reacted with acetylacetone in the presence of ammonium ion.

The absorption peak at a wavelength of 412 nm of the reaction product was measured by an UV spectrometer, and the amount of formaldehyde emitted (mg/kg) was determined.
(Aluminum Gloss, Change in Gloss Level According to Viewing Angle)

Each of pellets produced in [Examples] and [Comparative Examples] described later was molded using a 1-ounce molding machine (made by TOYO MACHINERY & METAL CO., LTD., trade name "TI-30G") on the condition of the cylinder temperature of 200° C., the metal mold temperature of 80° C., and the cooling time of 15 seconds to produce a test piece.

The test piece was produced using a metal mold measuring a length of 90 mm, a width of 50 mm, and a thickness of 2 mm.
<1> Aluminum Gloss The test piece was irradiated with direct sunlight on the condition where the direct sunlight entered the main surface of the test piece perpendicularly from behind an observer outside a room, and the gloss of the reflected light was visually determined by the observer. The criterion of determination is as follows.
⊚; strong glitter is provided by reflection of the aluminum pigment.
◯; glitter is provided by reflection of the aluminum pigment.
Δ; reduced glitter is provided by reflection of the aluminum pigment compared to above.
X; little glitter is provided by reflection of the aluminum pigment.

<2> Change in Color Tone According to Viewing Angle

Using the test piece and a digital variable angle gloss meter (UGV-5D; made by Suga Test Instruments Co., Ltd.), according to JIS 28741, the proportion (%) of the gloss level measured at 45° to the gloss level measured at 60° was measured wherein the gloss level measured at 60° was 100%. This was evaluated as the "gloss level 45°/60°."
(Weld Appearance (Weld Performance))

Each of pellets produced in [Examples] and [Comparative Examples] described later was molded on the condition of the metal mold temperature of 80° C. using a 1-ounce molding machine (made by TOYO MACHINERY & METAL CO., LTD., trade name "TI-30G") in which the cylinder temperature was set at 200° C., and a gear (3-point pin gate) as a molded article having a diameter of 60 mm and a thickness of 5 mm was obtained.

The weld of the molded article was observed visually and using an optical microscope, and evaluated according to the criterion below.
◯; weld line is thin and not remarkable.
Δ; weld line is at a middle level and can be found.
X; weld line is thick and can be clearly found.
(Weatherability)

Each of pellets produced in [Examples] and [Comparative Examples] described later was molded using a 1-ounce molding machine (made by TOYO MACHINERY & METAL CO., LTD., trade name "TI-30G") on the condition of the cylinder temperature of 200° C., the metal mold temperature of 80° C., and the cooling time of 15 seconds to produce a test piece.

Next, using a Super Xenon Weather Meter (trade name "XAL-2WL," made by Suga Test Instruments Co., Ltd.), the test piece was irradiated with light on the condition of a rising wavelength of 320 nm, the light intensity on the sample surface of 162 w/m$^2$ (light intensity control of 300 to 400 nm), a black panel temperature of 89° C., and no bright and dark cycle.

The time to which the surface of the test piece was cracked was measured, and evaluated as the weatherability.
(Repeated Impact Resistance after Aging)

Each of pellets produced in [Examples] and [Comparative Examples] described later was dried at 80° C. for 3 hours, and molded into an ISO dumbbell on the condition of the metal mold temperature of 90° C. and the cooling time of 30 seconds using a 5-ounce molding machine (made by TOSHIBA MACHINE CO., LTD., trade name "IS-100GN") in which the cylinder temperature was set at 205° C.

The dumbbell was hung in a geer oven set at 120° C., and heated for 240 hours.

Subsequently, the dumbbell was taken out from the geer oven, and left for 24 hours in a thermostat chamber kept at 23° C. and a humidity of 50%.

The dumbbell was cut into a long plate shape having a length of 80 mm, a width of 10 mm, and a thickness of 4 mm. A notch (edge R=0.25 mm, notch width=8 mm, notch depth=2 mm) was formed in a central portion in the length direction to obtain a test piece.

The obtained test piece was set in a repeated impact tester (Toyo Seiki Seisaku-sho, Ltd., trade name "AT Repeated Impact Tester"). A weight of 160 g was set, and dropped from a height of 20 mm to collide the test piece. This operation was repeated to give an impact to the test piece. The number of the impact (collision) until the test piece was broken was measured.

As the number of the impact until the test piece was broken was larger, it was determined that the test piece had higher repeated impact resistance. Thus, the test piece was evaluated.

(Amount of Formaldehyde to be Produced in Recycling)

Each of pellets produced in [Examples] and [Comparative Examples] described later was dried at 80° C. for 3 hours, and molded into a molded product on the injection condition of the injection pressure of 70 MPa, the injection time of 60 seconds, and the cooling time of 15 seconds, using an injection molding machine (Sumitomo Heavy Industries, Ltd., trade name "SH-75") in which the cylinder temperature was set at 205° C., and the metal mold temperature was set at 70° C.

The obtained molded product was ground by a V type mill, and the ground product was again molded into a molded product. Thus, a recycle molding test was performed.

Using an injection molding machine (made by TOSHIBA MACHINE CO., LTD., trade name "IS-100GN"), a ground product obtained after repeating molding 5 times was molded on the condition of the cylinder temperature of 220° C., the injection time of 15 seconds, the cooling time of 20 seconds, and the metal mold temperature of 77° C., to produce a test piece.

According to the method above (VDA275 method), the amount of formaldehyde emitted from the test piece was determined.

(Evaluation of Mold Deposit)

Using an injection molding machine (made by TOSHIBA MACHINE CO., LTD., trade name "IS-100GN") in which the cylinder temperature was set at 170° C. and the metal mold temperature was set at 60° C., each of pellets produced in [Examples] and [Comparative Examples] described later was molded into a grained flat plate having a thickness of 2 mm, a width of 80 mm, and a length 80 mm as a test piece on the condition where on the injection condition of the injection time of 60 seconds and the cooling time of 15 seconds, the test piece was short shot, namely, the resin composition was not completely filled into the metal mold.

The mass of the test piece was controlled to have 95% by mass of the test piece obtained by completely filling the resin composition into the metal mold.

The test piece was molded 300 shots on this condition, and the mold deposit within the metal mold after molding was visually observed, and evaluated according to the criterion below.

○; no mold deposit is found.
Δ; mold deposit is slightly found.
X; mold deposit is clearly found.
XX; a large amount of the mold deposit is found.

Example 1

100 parts by mass of the (a-1) polyacetal copolymer and 0.5 parts by mass of the (d-1) stabilizer were blended by a mixer, and 2 parts by mass of the (b-1) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 1 below.

Examples 2 and 3

The operation was performed in the same manner as in Example 1 except that the (b-1) aluminum pigment was replaced by the below (b-2) and (b-3) components shown in Table 1.

The results of evaluation are shown in Table 1 below.

Example 4

The operation was performed in the same manner as in Example 1 except that the (d-1) stabilizer was replaced by the (d-2) component.

The results of evaluation are shown in Table 1 below.

Comparative Examples 1 to 4

The operation was performed in the same manner as in Example 1 except that the (b-1) aluminum pigment was replaced by the (b-4) to (b-7) components shown in Table 1 below.

The results of evaluation are shown in Table 1 below.

Examples 5 to 11

The operation was performed in the same manner as in Example 1 except that the (b-1) aluminum pigment was replaced by the (b-8) and (b-10) to (b-15) components shown in Table 1 below.

The results of evaluation are shown in Table 1 below.

Comparative Example 5

The operation was performed in the same manner as in Example 1 except that the (b-1) aluminum pigment was replaced by the (b-9) component shown in Table 1 below.

The results of evaluation are shown in Table 1 below.

Example 12

100 parts by mass of the (a-1) polyacetal copolymer, 0.5 parts by mass of the (d-1) stabilizer, and 0.2 parts by mass of the (c-1) formaldehyde inhibitor were blended by a mixer, and 2 parts by mass of the (b-13) aluminum pigment were added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 1 below.

Examples 13 to 18

The operation was performed in the same manner as in Example 12 except that the (c-1) formaldehyde inhibitor was replaced by the (c-2) to (c-7) components shown in Table 1 below.

The results of evaluation are shown in Table 1 below.

Example 19

100 parts by mass of the (a-1) polyacetal copolymer, 0.5 parts by mass of the (d-1) stabilizer, and 0.2 parts by mass of the formaldehyde inhibitor blended in advance by a mixer (a mixture of (c-1) and (c-2) at 50/50 parts by mass) were blended by a mixer, and 2 parts by mass of the (b-8) aluminum pigment was added thereto and blended (in the description of the formaldehyde inhibitor, parts by mass of each component and the main peak of the melting point temperature of the mixture are shown in the table.).

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 2 below.

Examples 20 to 25

The operation was performed in the same manner as in Example 19 except that the (b-8) aluminum pigment was replaced by the (b-10) to (b-15) component shown in Table 2.

The results of evaluation are shown in Table 2 below.

Comparative Example 6

The operation was performed in the same manner as in Example 19 except that the (b-8) aluminum pigment was replaced by the (b-9) component shown in Table 2.

The results of evaluation are shown in Table 2 below.

Examples 26 to 31

The operation was performed in the same manner as in Example 23 except that the blending ratio of the formaldehyde inhibitor blended in advance in Example 23 (the mixture of (c-1) and (c-2) at 50/50 parts by mass) was changed to 90/10, 75/25, 70/30, 30/70, 25/75, and 10/90 parts by mass.

The results of evaluation are shown in Table 2 below.

Example 32

100 parts by mass of the (a-1) polyacetal copolymer, 0.5 parts by mass of the (d-1) stabilizer, and 0.2 parts by mass of the formaldehyde inhibitor blended in advance by a mixer (a mixture of (c-1) and (c-3) at 50/50 parts by mass) were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 2 below.

Example 33

100 parts by mass of the (a-1) polyacetal copolymer, 0.5 parts by mass of the (d-1) stabilizer, and 0.2 parts by mass of the formaldehyde inhibitor blended in advance by a mixer (a mixture of (c-2) and (c-3) at 50/50 parts by mass) were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 2 below.

Example 34

100 parts by mass of the (a-1) polyacetal copolymer, 0.5 parts by mass of the (d-1) stabilizer, and 0.2 parts by mass of the formaldehyde inhibitor blended in advance by a mixer (a mixture of (c-1), (c-2), and (c-3) at 45/45/10 parts by mass) were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 2 below.

Example 35

100 parts by mass of the (a-1) polyacetal copolymer, 0.5 parts by mass of the (d-1) stabilizer, and 0.2 parts by mass of the formaldehyde inhibitor blended in advance by a mixer (a mixture of (c-1) and (c-6) at 50/50 parts by mass) were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 3 below.

Example 36

100 parts by mass of the (a-1) polyacetal copolymer, 0.5 parts by mass of the (d-1) stabilizer, and 0.2 parts by mass of the formaldehyde inhibitor blended in advance by a mixer (a mixture of (c-2) and (c-6) at 50/50 parts by mass) were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 3 below.

Example 37

100 parts by mass of the (a-1) polyacetal copolymer, 0.5 parts by mass of the (d-1) stabilizer, and 0.2 parts by mass of the formaldehyde inhibitor blended in advance by a mixer (a mixture of (c-1) and (c-7) at 50/50 parts by mass) were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 3 below.

Example 38

100 parts by mass of the (a-1) polyacetal copolymer, 0.5 parts by mass of the (d-1) stabilizer, and 0.2 parts by mass of the formaldehyde inhibitor blended in advance by a mixer (a mixture of (c-2) and (c-7) at 50/50 parts by mass) were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 3 below.

Examples 39 to 41

The operation was performed in the same manner as in Example 23 except that the (a-1) component in Example 23 was replaced by the (a-2), (a-3), and (a-4) shown in Table 3 below.

The results of evaluation are shown in Table 3 below.

Examples 42 to 44

The operation was performed in the same manner as in Example 12 except that the (a-1) component in Example 12 was replaced by the (a-2), (a-3), and (a-4) shown in Table 3 below.

The results of evaluation are shown in Table 3 below.

Example 45

100 parts by mass of the (a-1) polyacetal copolymer, 0.5 parts by mass of the (d-1) stabilizer, 0.1 parts by mass of the (d-3) stabilizer, and 0.2 parts by mass of the formaldehyde inhibitor blended in advance by a mixer (a mixture of (c-1) and (c-2) at 50/50 parts by mass) were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 3 below.

Example 46 to 48

The operation was performed in the same manner as in Example 45 except that the (a-1) component in Example 45 was replaced by the (a-2), (a-3), and (a-4) shown in Table 3 below.

The results of evaluation are shown in Table 3 below.

Example 49

100 parts by mass of the (a-1) polyacetal copolymer, 0.5 parts by mass of the (d-1) stabilizer, 0.1 parts by mass of the (d-3) stabilizer, and 0.2 parts by mass of the formaldehyde inhibitor blended in advance by a mixer (a mixture of (c-1), (c-2), and (c-3) at 45/45/10 parts by mass) were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 3 below.

Example 50

100 parts by mass of the (a-1) polyacetal copolymer, 0.5 parts by mass of the (d-1) stabilizer, 0.1 parts by mass of the (d-3) stabilizer, and 0.2 parts by mass of the (c-1) formaldehyde inhibitor were blended by a mixer, and 2 parts by mass of the (b-13) aluminum pigment was added thereto and blended.

Using a single screw extruder with a 30 mm vent, the mixture was melt kneaded (melt mixed) on the condition of the setting temperature of 200° C., the number of rotation of 80 rpm, and a discharge amount of 10 kg/h while degassing was performed. Thus, a pellet was obtained.

The obtained pellet was dried at 80° C. for 3 hours, and subjected to the evaluations above.

The results of evaluation are shown in Table 3 below.

TABLE 1

| | (A) polyacetal copolymer | | (B) aluminum pigment | | | | |
| --- | --- | --- | --- | --- | --- | --- | --- |
| | Component | Parts by mass | Component | Parts by mass | $D_{50}$ (μm) | Proportion having particle size of not more than 10 μm (% by mass) | Average surface roughness Ra (nm) | Average height of surface roughness curve Rc (nm) |
| Example 1 | a-1 | 100 | b-1 | 2 | 32 | 8 | 32 | 110 |
| Example 2 | a-1 | 100 | b-2 | 2 | 30 | 8 | 35 | 130 |
| Example 3 | a-1 | 100 | b-3 | 2 | 30 | 10 | 42 | 150 |
| Example 4 | a-1 | 100 | b-1 | 2 | 32 | 8 | 32 | 110 |
| Comparative Example 1 | a-1 | 100 | b-4 | 2 | 35 | 10 | 65 | 250 |
| Comparative Example 2 | a-1 | 100 | b-5 | 2 | 28 | 6 | 12 | 60 |
| Comparative Example 3 | a-1 | 100 | b-6 | 2 | 16 | 20 | 8 | 70 |
| Comparative Example 4 | a-1 | 100 | b-7 | 2 | 60 | 5 | 35 | 150 |
| Example 5 | a-1 | 100 | b-8 | 2 | 28 | 0.4 | 30 | 120 |
| Example 6 | a-1 | 100 | b-10 | 2 | 22 | 4 | 30 | 100-120 |
| Example 7 | a-1 | 100 | b-11 | 2 | 22 | 6 | 30 | 100-120 |
| Example 8 | a-1 | 100 | b-12 | 2 | 21 | 8 | 30 | 100-120 |

TABLE 1-continued

| | | | | | | | | |
|---|---|---|---|---|---|---|---|---|
| Example 9 | a-1 | 100 | b-13 | 2 | 20 | 12 | 30 | 100-120 |
| Example 10 | a-1 | 100 | b-14 | 2 | 18 | 20 | 30 | 100-120 |
| Example 11 | a-1 | 100 | b-15 | 2 | 16 | 25 | 30 | 100-120 |
| Comparative Example 5 | a-1 | 100 | b-9 | 2 | 12 | 40 | 30 | 100 |
| Example 12 | a-1 | 100 | b-13 | 2 | 20 | 12 | 30 | 100-120 |
| Example 13 | a-1 | 100 | b-13 | 2 | 20 | 12 | 30 | 100-120 |
| Example 14 | a-1 | 100 | b-13 | 2 | 20 | 12 | 30 | 100-120 |
| Example 15 | a-1 | 100 | b-13 | 2 | 20 | 12 | 30 | 100-120 |
| Example 16 | a-1 | 100 | b-13 | 2 | 20 | 12 | 30 | 100-120 |
| Example 17 | a-1 | 100 | b-13 | 2 | 20 | 12 | 30 | 100-120 |
| Example 18 | a-1 | 100 | b-13 | 2 | 20 | 12 | 30 | 100-120 |

| | (C) formaldehyde inhibitor | | Peak temperature °C. | (D) stabilizer | | Mechanical properties | | | Fluidity |
|---|---|---|---|---|---|---|---|---|---|
| | Component | Parts by mass | | Component | Parts by mass | TS (MPa) | TE (%) | Izod impact strength | MFR (g/10 min) |
| Example 1 | — | — | — | d-1 | 0.5 | 60 | 20 | 3.7 | 9.6 |
| Example 2 | — | — | — | d-1 | 0.5 | 60 | 21 | 3.7 | 9.6 |
| Example 3 | — | — | — | d-1 | 0.5 | 60 | 20 | 3.7 | 9.5 |
| Example 4 | — | — | — | d-2 | 0.5 | 60 | 20 | 3.7 | 9.5 |
| Comparative Example 1 | — | — | — | d-1 | 0.5 | 59 | 20 | 3.6 | 9.6 |
| Comparative Example 2 | — | — | — | d-1 | 0.5 | 58 | 22 | 3.7 | 9.3 |
| Comparative Example 3 | — | — | — | d-1 | 0.5 | 60 | 24 | 3.7 | 9.1 |
| Comparative Example 4 | — | — | — | d-1 | 0.5 | 60 | 18 | 3.3 | 9.1 |
| Example 5 | — | — | — | d-1 | 0.5 | 59 | 20 | 3.6 | 9.6 |
| Example 6 | — | — | — | d-1 | 0.5 | 60 | 21 | 3.6 | 9.5 |
| Example 7 | — | — | — | d-1 | 0.5 | 60 | 20 | 3.7 | 9.6 |
| Example 8 | — | — | — | d-1 | 0.5 | 60 | 20 | 3.7 | 9.6 |
| Example 9 | — | — | — | d-1 | 0.5 | 60 | 20 | 3.7 | 9.6 |
| Example 10 | — | — | — | d-1 | 0.5 | 60 | 21 | 3.7 | 9.5 |
| Example 11 | — | — | — | d-1 | 0.5 | 60 | 22 | 3.7 | 9.3 |
| Comparative Example 5 | — | — | — | d-1 | 0.5 | 60 | 23 | 3.7 | 9.1 |
| Example 12 | c-1 | 0.2 | 180 | d-1 | 0.5 | 60 | 20 | 3.7 | 9.6 |
| Example 13 | c-2 | 0.2 | 171 | d-1 | 0.5 | 60 | 21 | 3.6 | 9.5 |
| Example 14 | c-3 | 0.2 | 171 | d-1 | 0.5 | 60 | 22 | 3.7 | 9.6 |
| Example 15 | c-4 | 0.2 | — | d-1 | 0.5 | 60 | 20 | 3.7 | 9.6 |
| Example 16 | c-5 | 0.2 | — | d-1 | 0.5 | 60 | 20 | 3.7 | 9.6 |
| Example 17 | c-6 | 0.2 | ND | d-1 | 0.5 | 60 | 22 | 3.6 | 9.7 |
| Example 18 | c-7 | 0.2 | ND | d-1 | 0.5 | 60 | 22 | 3.6 | 9.7 |

| | Amount of formaldehyde to be produced (mg/kg) | Aluminum gloss (visually observed) | Gloss level 45°/60° (%) | Weld performance | Weatherability time to which crack occurs (hrs) | Repeated impact resistance (the number of times) | Amount of formaldehyde to be produced in recycle (mg/kg) | Mold deposit |
|---|---|---|---|---|---|---|---|---|
| Example 1 | 10 | ○ | 70 | ○ | 200 | 800 | 25 | ○ |
| Example 2 | 10 | ○ | 70 | ○ | 200 | 800 | 25 | ○ |
| Example 3 | 10 | ○ | 70 | ○ | 200 | 800 | 25 | ○ |
| Example 4 | 8 | ○ | 65 | ○ | <100 | 800 | 23 | ○ |
| Comparative Example 1 | 10 | X | 70 | ○ | 200 | 720 | 22 | ○ |
| Comparative Example 2 | 10 | ◉ | 40 | Δ | 200 | 800 | 29 | ○ |
| Comparative Example 3 | 13 | ◉ | 40 | Δ | 200 | 860 | 33 | Δ |
| Comparative Example 4 | 13 | X | 70 | X | 150 | 700 | 30 | Δ |
| Example 5 | 8 | ○ | 60 | Δ | 200 | 720 | 25 | ○ |
| Example 6 | 8 | ○ | 65 | ○-Δ | 150 | 740 | 29 | ○ |
| Example 7 | 8 | ○ | 65 | ○ | 150 | 760 | 30 | ○ |
| Example 8 | 8 | ○ | 70 | ○ | 200 | 780 | 29 | ○ |
| Example 9 | 8 | ○ | 70 | ○ | 200 | 800 | 30 | ○ |
| Example 10 | 11 | ○-Δ | 70 | ○ | 200 | 830 | 30 | ○ |
| Example 11 | 13 | ○-Δ | 70 | ○ | 200 | 840 | 30 | Δ |
| Comparative Example 5 | 13 | X | 70 | ○ | 200 | 800 | 35 | Δ |
| Example 12 | 1.3 | ○ | 70 | ○ | 200 | 950 | 1.9 | X |
| Example 13 | 1.3 | ○ | 70 | ○ | 200 | 930 | 2.2 | X |
| Example 14 | 1.4 | ○ | 70 | ○ | 200 | 900 | 1.9 | X |
| Example 15 | 2.6 | ○ | 70 | ○ | 200 | 930 | 3.8 | X |

TABLE 1-continued

| | | | | | | | | |
|---|---|---|---|---|---|---|---|---|
| Example 16 | 4.6 | ○ | 70 | ○ | 200 | 900 | 6.7 | X |
| Example 17 | 2.0 | ○ | 70 | ○ | 200 | 900 | 3.4 | X |
| Example 18 | 1.9 | ○ | 70 | ○ | 200 | 930 | 3.3 | X |

TABLE 2

| | (A) polyacetal copolymer | | (B) aluminum pigment | | | | | |
|---|---|---|---|---|---|---|---|---|
| | Component | Parts by mass | Component | Parts by mass | $D_{50}$ (μm) | Proportion having particle size of not more than 10 μm (% by mass) | Average surface roughness Ra (nm) | Average height of surface roughness curve Rc (nm) |
| Example 19 | a-1 | 100 | b-8 | 2 | 28 | 0.4 | 30 | 120 |
| Example 20 | a-1 | 100 | b-10 | 2 | 22 | 4 | 30 | 100-120 |
| Example 21 | a-1 | 100 | b-11 | 2 | 22 | 6 | 30 | 100-120 |
| Example 22 | a-1 | 100 | b-12 | 2 | 21 | 8 | 30 | 100-120 |
| Example 23 | a-1 | 100 | b-13 | 2 | 20 | 12 | 30 | 100-120 |
| Example 24 | a-1 | 100 | b-14 | 2 | 18 | 20 | 30 | 100-120 |
| Example 25 | a-1 | 100 | b-15 | 2 | 16 | 25 | 30 | 100-120 |
| Comparative Example 6 | a-1 | 100 | b-9 | 2 | 12 | 40 | 30 | 100 |
| Example 26 | a-1 | 100 | b-13 | 2 | 20 | 12 | 30 | 100-120 |
| Example 27 | a-1 | 100 | b-13 | 2 | 20 | 12 | 30 | 100-120 |
| Example 28 | a-1 | 100 | b-13 | 2 | 20 | 12 | 30 | 100-120 |
| Example 29 | a-1 | 100 | b-13 | 2 | 20 | 12 | 30 | 100-120 |
| Example 30 | a-1 | 100 | b-13 | 2 | 20 | 12 | 30 | 100-120 |
| Example 31 | a-1 | 100 | b-13 | 2 | 20 | 12 | 30 | 100-120 |
| Example 32 | a-1 | 100 | b-13 | 2 | 20 | 12 | 30 | 100-120 |
| Example 33 | a-1 | 100 | b-13 | 2 | 20 | 12 | 30 | 100-120 |
| Example 34 | a-1 | 100 | b-13 | 2 | 20 | 12 | 30 | 100-120 |

| | (C) formaldehyde inhibitor | | Peak temperature °C. | (D) stabilizer | | Mechanical properties | | | Fluidity |
|---|---|---|---|---|---|---|---|---|---|
| | Component | Parts by mass | | Component | Parts by mass | TS (MPa) | TE (%) | Izod impact strength | MFR (g/10 min) |
| Example 19 | c-1<br>c-2 | 0.1<br>0.1 | 154 | d-1 | 0.5 | 60 | 21 | 3.7 | 9.6 |
| Example 20 | c-1<br>c-2 | 0.1<br>0.1 | 154 | d-1 | 0.5 | 60 | 22 | 3.7 | 9.5 |
| Example 21 | c-1<br>c-2 | 0.1<br>0.1 | 154 | d-1 | 0.5 | 60 | 21 | 3.7 | 9.6 |
| Example 22 | c-1<br>c-2 | 0.1<br>0.1 | 154 | d-1 | 0.5 | 60 | 21 | 3.7 | 9.6 |
| Example 23 | c-1<br>c-2 | 0.1<br>0.1 | 154 | d-1 | 0.5 | 60 | 22 | 3.7 | 9.6 |
| Example 24 | c-1<br>c-2 | 0.1<br>0.1 | 154 | d-1 | 0.5 | 60 | 22 | 3.7 | 9.5 |
| Example 25 | c-1<br>c-2 | 0.1<br>0.1 | 154 | d-1 | 0.5 | 60 | 22 | 3.7 | 9.2 |
| Comparative Example 6 | c-1<br>c-2 | 0.1<br>0.1 | 154 | d-1 | 0.5 | 59 | 24 | 3.7 | 9.1 |
| Example 26 | c-1<br>c-2 | 0.18<br>0.02 | 172 | d-1 | 0.5 | 60 | 22 | 3.7 | 9.6 |
| Example 27 | c-1<br>c-2 | 0.15<br>0.05 | 164 | d-1 | 0.5 | 60 | 22 | 3.7 | 9.6 |
| Example 28 | c-1<br>c-2 | 0.14<br>0.06 | 150 | d-1 | 0.5 | 60 | 22 | 3.7 | 9.6 |
| Example 29 | c-1<br>c-2 | 0.06<br>0.14 | 148 | d-1 | 0.5 | 60 | 22 | 3.7 | 9.6 |
| Example 30 | c-1<br>c-2 | 0.05<br>0.15 | 164 | d-1 | 0.5 | 60 | 22 | 3.7 | 9.6 |
| Example 31 | c-1<br>c-2 | 0.02<br>0.18 | 168 | d-1 | 0.5 | 60 | 22 | 3.7 | 9.6 |
| Example 32 | c-1<br>c-3 | 0.1<br>0.1 | 144 | d-1 | 0.5 | 60 | 22 | 3.7 | 9.6 |
| Example 33 | c-2<br>c-3 | 0.1<br>0.1 | 151 | d-1 | 0.5 | 60 | 22 | 3.7 | 9.6 |
| Example 34 | c-1<br>c-2<br>c-3 | 0.09<br>0.09<br>0.02 | 154 | d-1 | 0.5 | 60 | 22 | 3.7 | 9.6 |

TABLE 2-continued

|  | Amount of formaldehyde to be produced (mg/kg) | Aluminum gloss (visually observed) | Gloss level 45°/60° (%) | Weld performance | Weatherability time to which crack occurs (hrs) | Repeated impact resistance (the number of times) | Amount of formaldehyde to be produced in recycle (mg/kg) | Mold deposit |
|---|---|---|---|---|---|---|---|---|
| Example 19 | 0.8 | ○ | 60 | Δ | 150 | 1030 | 1.2 | ○ |
| Example 20 | 1.0 | ○ | 65 | ○-Δ | 150 | 1060 | 1.4 | ○ |
| Example 21 | 1.0 | ○ | 65 | ○ | 200 | 1080 | 1.5 | ○ |
| Example 22 | 1.0 | ○ | 70 | ○ | 200 | 1110 | 1.4 | ○ |
| Example 23 | 0.9 | ○ | 70 | ○ | 200 | 1150 | 1.4 | ○ |
| Example 24 | 1.1 | ○-Δ | 70 | ○ | 200 | 1180 | 1.5 | ○ |
| Example 25 | 1.2 | ○-Δ | 70 | ○ | 200 | 1200 | 1.5 | ○ |
| Comparative Example 6 | 1.5 | X | 70 | ○ | 200 | 1260 | 1.9 | ○ |
| Example 26 | 1.2 | ○ | 70 | ○ | 200 | 1050 | 1.8 | X |
| Example 27 | 1.0 | ○ | 70 | ○ | 200 | 1080 | 1.7 | Δ-○ |
| Example 28 | 0.9 | ○ | 70 | ○ | 200 | 1150 | 1.4 | ○ |
| Example 29 | 1.0 | ○ | 70 | ○ | 200 | 1150 | 1.4 | ○ |
| Example 30 | 1.1 | ○ | 70 | ○ | 200 | 1100 | 1.6 | Δ-○ |
| Example 31 | 1.2 | ○ | 70 | ○ | 200 | 1050 | 1.8 | X |
| Example 32 | 1.1 | ○ | 70 | ○ | 200 | 1300 | 1.4 | ○ |
| Example 33 | 1.1 | ○ | 70 | ○ | 200 | 1100 | 1.5 | ○ |
| Example 34 | 1.0 | ○ | 70 | ○ | 200 | 1150 | 1.4 | ○ |

TABLE 3

| | (A) polyacetal copolymer | | (B) aluminum pigment | | | | | |
|---|---|---|---|---|---|---|---|---|
| | Component | Parts by mass | Component | Parts by mass | $D_{50}$ (μm) | Proportion having particle size of not more than 10 μm (% by mass) | Average surface roughness Ra (nm) | Average height of surface roughness curve Rc (nm) |
| Example 35 | a-1 | 100 | b-13 | 2 | 20 | 12 | 30 | 100-120 |
| Example 36 | a-1 | 100 | b-13 | 2 | 20 | 12 | 30 | 100-120 |
| Example 37 | a-1 | 100 | b-13 | 2 | 20 | 12 | 30 | 100-120 |
| Example 38 | a-1 | 100 | b-13 | 2 | 20 | 12 | 30 | 100-120 |
| Example 39 | a-2 | 100 | b-13 | 2 | 20 | 12 | 30 | 100-120 |
| Example 40 | a-3 | 100 | b-13 | 2 | 20 | 12 | 30 | 100-120 |
| Example 41 | a-4 | 100 | b-13 | 2 | 20 | 12 | 30 | 100-120 |
| Example 42 | a-2 | 100 | b-13 | 2 | 20 | 12 | 30 | 100-120 |
| Example 43 | a-3 | 100 | b-13 | 2 | 20 | 12 | 30 | 100-120 |
| Example 44 | a-4 | 100 | b-13 | 2 | 20 | 12 | 30 | 100-120 |
| Example 45 | a-1 | 100 | b-13 | 2 | 20 | 12 | 30 | 100-120 |
| Example 46 | a-2 | 100 | b-13 | 2 | 20 | 12 | 30 | 100-120 |
| Example 47 | a-3 | 100 | b-13 | 2 | 20 | 12 | 30 | 100-120 |
| Example 48 | a-4 | 100 | b-13 | 2 | 20 | 12 | 30 | 100-120 |
| Example 49 | a-1 | 100 | b-13 | 2 | 20 | 12 | 30 | 100-120 |
| Example 50 | a-1 | 100 | b-13 | 2 | 20 | 12 | 30 | 100-120 |

| | (C) formaldehyde inhibitor | | | (D) stabilizer | | Mechanical properties | | | Fluidity |
|---|---|---|---|---|---|---|---|---|---|
| | Component | Parts by mass | Peak temperature °C. | Component | Parts by mass | TS (MPa) | TE (%) | Izod impact strength | MFR (g/10 min) |
| Example 35 | c-1 c-6 | 0.1 0.1 | ND | d-1 | 0.5 | 60 | 22 | 3.7 | 9.6 |
| Example 36 | c-2 c-6 | 0.1 0.1 | ND | d-1 | 0.5 | 60 | 22 | 3.7 | 9.6 |
| Example 37 | c-1 c-7 | 0.1 0.1 | ND | d-1 | 0.5 | 60 | 22 | 3.7 | 9.6 |
| Example 38 | c-2 c-7 | 0.1 0.1 | ND | d-1 | 0.5 | 60 | 22 | 3.7 | 9.6 |
| Example 39 | c-1 c-2 | 0.1 0.1 | 154 | d-1 | 0.5 | 58 | 28 | 3.8 | 9.6 |
| Example 40 | c-1 c-2 | 0.1 0.1 | 154 | d-1 | 0.5 | 63 | 23 | 3.8 | 9.6 |
| Example 41 | c-1 c-2 | 0.1 0.1 | 154 | d-1 | 0.5 | 64 | 19 | 3.6 | 9.7 |
| Example 42 | c-1 | 0.2 | 180 | d-1 | 0.5 | 58 | 25 | 3.8 | 9.6 |
| Example 43 | c-1 | 0.2 | 180 | d-1 | 0.5 | 63 | 20 | 3.8 | 9.6 |
| Example 44 | c-1 | 0.2 | 180 | d-1 | 0.5 | 64 | 17 | 3.5 | 9.7 |

TABLE 3-continued

| | | | | | | | | | |
|---|---|---|---|---|---|---|---|---|---|
| Example 45 | c-1 | 0.1 | 154 | d-1 | 0.5 | 60 | 24 | 3.8 | 9.6 |
| | c-2 | 0.1 | | d-3 | 0.1 | | | | |
| Example 46 | c-1 | 0.1 | 154 | d-1 | 0.5 | 58 | 18 | 3.8 | 9.6 |
| | c-2 | 0.1 | | d-3 | 0.1 | | | | |
| Example 47 | c-1 | 0.1 | 154 | d-1 | 0.5 | 63 | 23 | 3.8 | 9.6 |
| | c-2 | 0.1 | | d-3 | 0.1 | | | | |
| Example 48 | c-1 | 0.1 | 154 | d-1 | 0.5 | 64 | 20 | 3.6 | 9.6 |
| | c-2 | 0.1 | | d-3 | 0.1 | | | | |
| Example 49 | c-1 | 0.09 | 154 | d-1 | 0.5 | 60 | 24 | 3.8 | 9.6 |
| | c-2 | 0.09 | | d-3 | 0.1 | | | | |
| | c-3 | 0.02 | | | | | | | |
| Example 50 | c-1 | 0.2 | 180 | d-1 | 0.5 | 60 | 20 | 3.7 | 9.6 |
| | | | | d-3 | 0.1 | | | | |

| | Amount of formaldehyde to be produced (mg/kg) | Aluminum gloss (visually observed) | Gloss level 45°/60° (%) | Weld performance | Weatherability time to which crack occurs (hrs) | Repeated impact resistance (the number of times) | Amount of formaldehyde to be produced in recycle (mg/kg) | Mold deposit |
|---|---|---|---|---|---|---|---|---|
| Example 35 | 1.6 | ○ | 70 | ○ | 200 | 970 | 2.5 | X |
| Example 36 | 1.6 | ○ | 70 | ○ | 200 | 950 | 2.4 | X |
| Example 37 | 1.6 | ○ | 70 | ○ | 200 | 930 | 2.5 | X |
| Example 38 | 1.6 | ○ | 70 | ○ | 200 | 900 | 2.5 | X |
| Example 39 | 0.7 | ○ | 70 | ○ | 200 | 1180 | 0.9 | ○ |
| Example 40 | 1.3 | ○ | 70 | ○ | 200 | 1120 | 1.8 | ○ |
| Example 41 | 1.6 | ○ | 70 | ○ | 150 | 900 | 2.3 | ○ |
| Example 42 | 1.0 | ○ | 70 | ○ | 200 | 1000 | 1.3 | X |
| Example 43 | 1.4 | ○ | 70 | ○ | 200 | 950 | 2.2 | X |
| Example 44 | 1.7 | ○ | 70 | ○ | 150 | 900 | 2.6 | X |
| Example 45 | 0.9 | ○ | 70 | ○ | 700 | 1150 | 1.4 | ○ |
| Example 46 | 0.8 | ○ | 70 | ○ | 800 | 1180 | 1.0 | ○ |
| Example 47 | 1.4 | ○ | 70 | ○ | 600 | 1060 | 1.7 | ○ |
| Example 48 | 1.6 | ○ | 70 | ○ | 500 | 950 | 2.4 | ○ |
| Example 49 | 0.9 | ○ | 70 | ○ | 700 | 1170 | 1.3 | ○ |
| Example 50 | 1.3 | ○ | 70 | ○ | 700 | 900 | 1.9 | X |

As can be seen from the results of evaluation in Table 1, Table 2, and Table 3, according to Examples 1 to 50, polyacetal composition having a high aluminum gloss and small gloss level change according to the viewing angle are obtained by using an aluminum pigment having a specific shape, particle size, and surface state.

Further, by use of the (C) formaldehyde inhibitor, in addition to the properties above, the amount of formaldehyde to be produced is reduced. Further, by use of the combined system of carboxylic acid hydrazides showing reduction in the melting point as the formaldehyde inhibitor, the amount of formaldehyde to be produced in molding and the amount of formaldehyde to be produced in recycle are reduced and suppressed. The repeated impact resistance after aging is high, and mold deposit properties are good under the condition where the filling rate into the metal mold is low in the molding process. According to Examples 1 to 50, a molded article having such properties, and a polyacetal resin composition enabling production of the molded article are obtained.

The present application is based on Japanese Patent Application (No. 2010-095089) filed with the Japanese Patent Office on Apr. 16, 2010, the contents of which are incorporated herein by reference.

INDUSTRIAL APPLICABILITY

The polyacetal resin composition according to the present invention has industrial applicability as a material for members for designable parts.

The invention claimed is:

1. A polyacetal resin composition comprising:
(A) 100 parts by mass of a polyacetal copolymer resin, and
(B) 0.1 to 10 parts by mass of an aluminum pigment, the aluminum pigment having a coin-like or flake-like flat shape, a volume average particle size $D_{50}$ of 15 to 50 μm, an average surface roughness Ra of 25 to 50 nm, and an average height Rc of depressions and projections in a surface roughness curve of 90 to 200 nm.

2. The polyacetal resin composition according to claim 1, wherein the (B) aluminum pigment contains 5 to 40% by volume of a particle having a particle size of not more than 10 μm.

3. The polyacetal resin composition according to claim 1, wherein the (A) polyacetal copolymer resin further comprises at least one of an antioxidant and a hindered amine stabiliser.

4. The polyacetal resin composition according to claim 1, further comprising 0.005 to 5 parts by mass of (C) a formaldehyde inhibitor.

5. The polyacetal resin composition according to claim 4, wherein the (C) formaldehyde inhibitor is at least one selected from the group consisting of aminotriazine compounds, cyclic urea compounds, and carboxylic acid hydrazide compounds.

6. The polyacetal resin composition according to claim 4, wherein the (C) formaldehyde inhibitor is a combined inhibitor of a carboxylic acid hydrazide compound comprising a mixture of a carboxylic acid hydrazide (C-1) and a carboxylic acid hydrazide (C-2) different from the (C-1); the (C) formaldehyde inhibitor is contained in an amount of 0.01 to 2 parts by mass; and the melting point of the mixture of the carboxylic acid hydrazide (C-1) and the carboxylic acid hydrazide (C-2) as measured using a differential thermal analyzer satisfies the following expressions (1) and (2):

$$T1 < T2 \tag{1}$$

$$T1 < T3 \tag{2}$$

wherein T1 represents a temperature (° C.) at which an amount of heat to be absorbed shows a vertex of the largest endothermic peak among endothermic peaks obtained by heating and cooling the mixture of the carboxylic acid hydrazide (C-1) and the carboxylic acid hydrazide (C-2) according to a predetermined temperature program below, and raising a temperature at a rate of 2.5° C./min until the mixture melts;

T2 represents a temperature (° C.) at which an amount of heat to be absorbed shows a vertex of the largest endothermic peak among endothermic peaks obtained by heating and cooling the carboxylic acid hydrazide (C-1) according to a predetermined temperature program, and raising a temperature at a rate of 2.5° C./min until the carboxylic acid hydrazide (C-1) melts;

T3 represents a temperature (° C.) at which an amount of heat to be absorbed shows a vertex of the largest endothermic peak among endothermic peaks obtained by heating and cooling the polyacetal copolymer resin (A) according to a predetermined temperature program, and raising a temperature at a rate of 2.5° C./min until the polyacetal copolymer resin (A) melts;

the predetermined temperature program used for determination of T1 and T2 means a program comprising raising a temperature at a rate of 2.5° C./min from a temperature lower than the endothermic peak temperature of a compound to be measured to a temperature at which the compound to be measured melts, keeping the temperature for 2 minutes, and then, lowering the temperature to 100° C. at a temperature falling rate of 10° C./min by allowing it to stand; and the predetermined temperature program for polyacetal copolymer resin (A) used for determination of T3 means a temperature program comprising raising a temperature at a rate of 320° C./min from a temperature lower than the endothermic peak temperature of the polyacetal copolymer resin (A) to 200° C., keeping the temperature at 200° C. for 2 minutes, and lowering the temperature at a rate of 10° C./min to 100° C.

7. The polyacetal resin composition according to claim 6, wherein the carboxylic acid hydrazide (C-1) and the carboxylic acid hydrazide (C-2) are different carboxylic acid dihydrazides selected from the group consisting of adipic acid hydrazide, sebacic acid hydrazide, and dodecanedioic acid hydrazide.

8. A method for producing a polyacetal resin composition, comprising the steps of: blending (A) a polyacetal copolymer resin with (C) a formaldehyde inhibitor, and mixing the blend with (B) 0.1 to 10 parts by mass of an aluminum pigment, the aluminum pigment having a coin-like or flake-like flat shape, a volume average particle size $D_{50}$ of 15 to 50 µm, an average surface roughness Ra of 25 to 50 nm, and an average height Rc of depressions and projections in a surface roughness curve of 90 to 200 nm, and extrusion kneading the mixture.

9. A molded article obtained by molding the polyacetal resin composition according to claim 1.

10. The molded article according to claim 9, wherein in a gloss level of the molded article measured according to JIS Z8741, a measured value at a measured angle of 45° is not less than 50% when a measured value at a measured angle of 60° is 100%.

11. The molded article according to claim 9, wherein the molded article is one of parts selected from the group consisting of parts included in OA apparatuses, music, video, or information apparatuses, or communication apparatuses, industrial parts included in office furniture or housing apparatuses, and parts for interiors and exteriors of automobiles.

12. The molded article according to claim 9, wherein the molded article has a designed surface having grain finish.

13. The molded article according to claim 9, wherein the molded article is a part selected from the group consisting of parts for handles, switches, and buttons.

14. The method according to claim 8, further comprising mixing the blend with a color pigment.

\* \* \* \* \*